(12) United States Patent
Terashima et al.

(10) Patent No.: US 9,065,549 B2
(45) Date of Patent: *Jun. 23, 2015

(54) CORRELATION CALCULATING METHOD, SATELLITE SIGNAL CAPTURING METHOD, AND CORRELATION CALCULATING CIRCUIT

(71) Applicant: Seiko Epson Corporation, Shinjuku-ku (JP)

(72) Inventors: Maho Terashima, Matsumoto (JP); Naoki Gobara, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/109,807

(22) Filed: Dec. 17, 2013

(65) Prior Publication Data

US 2014/0105252 A1 Apr. 17, 2014

Related U.S. Application Data

(63) Continuation of application No. 13/069,349, filed on Mar. 22, 2011, now Pat. No. 8,634,504.

(30) Foreign Application Priority Data

Mar. 23, 2010 (JP) .................................. 2010-065842
Dec. 9, 2010 (JP) .................................. 2010-274804

(51) Int. Cl.
*H04B 1/00* (2006.01)
*H04B 1/709* (2011.01)
*G01S 19/30* (2010.01)
*H04B 1/7075* (2011.01)

(52) U.S. Cl.
CPC ................ *H04B 1/709* (2013.01); *G01S 19/30* (2013.01); *H04B 1/7075* (2013.01)

(58) Field of Classification Search
CPC ........ H04B 1/69; H04B 1/707; H04B 1/7073; H04B 1/7075; H04B 1/70757; H04B 1/709; H04B 1/7093; H04B 1/7095; H04B 1/70752
USPC ......... 375/316, 140, 142, 143, 145, 147, 149, 375/150, 152
See application file for complete search history.

(56) References Cited

U.S. PATENT DOCUMENTS

| 5,898,665 | A | 4/1999 | Sawahashi et al. |
| 6,154,487 | A | 11/2000 | Murai et al. |
| 8,634,504 | B2 * | 1/2014 | Terashima et al. ............ 375/340 |
| 8,737,363 | B2 * | 5/2014 | Ozluturk et al. .............. 370/335 |

(Continued)

FOREIGN PATENT DOCUMENTS

| JP | 2001-159670 A | 6/2001 |
| JP | 2006-270510 A | 10/2006 |

*Primary Examiner* — Siu Lee
(74) *Attorney, Agent, or Firm* — Kilpatrick Townsend & Stockton LLP

(57) ABSTRACT

A correlation calculating method of correlating a received code signal obtained by demodulating a received signal, which is a signal obtained by receiving a positioning satellite signal, with a replica code signal is provided which includes: correlating values of the replica code signal in a chip period with values of the received code signal at first to n-th arrival times obtained by varying an arrival time of the chip period by 1/n chip (where n is an integer equal to or greater than 2); and acquiring a correlation calculation result at a 1/n chip interval by synthesizing the correlation calculation results.

20 Claims, 15 Drawing Sheets

(56) References Cited

U.S. PATENT DOCUMENTS

| | | | |
|---|---|---|---|
| 8,755,472 B2 * | 6/2014 | Sun et al. | 375/343 |
| 2002/0150150 A1 | 10/2002 | Kohli et al. | |
| 2004/0202235 A1 * | 10/2004 | Kohli et al. | 375/150 |
| 2006/0215740 A1 | 9/2006 | Teruuchi et al. | |
| 2008/0101442 A1 | 5/2008 | Rasmussen | |
| 2008/0151970 A1 | 6/2008 | Chen et al. | |
| 2009/0259707 A1 | 10/2009 | Martin et al. | |
| 2010/0040117 A1 | 2/2010 | Lawrow | |

* cited by examiner

FIG. 1A

| | | | | | | |
|---|---|---|---|---|---|---|
| $corr_0$ | $d_1 \cdot r_1$ | $d_2 \cdot r_1$ | $d_3 \cdot r_3$ | $d_4 \cdot r_3$ | $d_5 \cdot r_5$ | $d_6 \cdot r_5$ ... |
| $corr_1$ | $d_1 \cdot r_{2045}$ | $d_2 \cdot r_1$ | $d_3 \cdot r_1$ | $d_4 \cdot r_3$ | $d_5 \cdot r_3$ | $d_6 \cdot r_5$ ... |
| $corr_2$ | $d_1 \cdot r_{2045}$ | $d_2 \cdot r_{2045}$ | $d_3 \cdot r_1$ | $d_4 \cdot r_1$ | $d_5 \cdot r_3$ | $d_6 \cdot r_3$ ... |
| $corr_3$ | $d_1 \cdot r_{2043}$ | $d_2 \cdot r_{2045}$ | $d_3 \cdot r_{2045}$ | $d_4 \cdot r_1$ | $d_5 \cdot r_1$ | $d_6 \cdot r_3$ ... |

FIG. 1B

| | | | | | | |
|---|---|---|---|---|---|---|
| $NewCorr_0$ | $d_1 \cdot r_1$ | | $d_3 \cdot r_3$ | | $d_5 \cdot r_5$ | ... |
| $NewCorr_1$ | | $d_2 \cdot r_1$ | | $d_4 \cdot r_3$ | | $d_6 \cdot r_5$ ... |
| $NewCorr_2$ | $d_1 \cdot r_{2045}$ | | $d_3 \cdot r_1$ | | $d_5 \cdot r_3$ | ... |
| $NewCorr_3$ | | $d_2 \cdot r_{2045}$ | | $d_4 \cdot r_1$ | | $d_6 \cdot r_3$ ... |

FIG. 1C

| | | | | | | |
|---|---|---|---|---|---|---|
| $NewCorr_0$ | | $d_2 \cdot r_1$ | | $d_4 \cdot r_3$ | | $d_6 \cdot r_5$ ... |
| $NewCorr_1$ | $d_1 \cdot r_{2045}$ | | $d_3 \cdot r_1$ | | $d_5 \cdot r_3$ | ... |
| $NewCorr_2$ | | $d_2 \cdot r_{2045}$ | | $d_4 \cdot r_1$ | | $d_6 \cdot r_3$ ... |
| $NewCorr_3$ | $d_1 \cdot r_{2043}$ | | $d_3 \cdot r_{2045}$ | | $d_5 \cdot r_1$ | ... |

FIG. 2A

| | | | | | | |
|---|---|---|---|---|---|---|
| $corr_0$ | $d_1 \cdot r_2$ | $d_2 \cdot r_2$ | $d_3 \cdot r_4$ | $d_4 \cdot r_4$ | $d_5 \cdot r_6$ | $d_6 \cdot r_6$ ... |
| $corr_1$ | $d_1 \cdot r_{2046}$ | $d_2 \cdot r_2$ | $d_3 \cdot r_2$ | $d_4 \cdot r_4$ | $d_5 \cdot r_4$ | $d_6 \cdot r_6$ ... |
| $corr_2$ | $d_1 \cdot r_{2046}$ | $d_2 \cdot r_{2046}$ | $d_3 \cdot r_2$ | $d_4 \cdot r_2$ | $d_5 \cdot r_4$ | $d_6 \cdot r_4$ ... |
| $corr_3$ | $d_1 \cdot r_{2044}$ | $d_2 \cdot r_{2046}$ | $d_3 \cdot r_{2046}$ | $d_4 \cdot r_2$ | $d_5 \cdot r_2$ | $d_6 \cdot r_4$ ... |

| | | | | | | |
|---|---|---|---|---|---|---|
| $NewCorr_0$ | $d_1 \cdot r_2$ | | $d_3 \cdot r_4$ | | $d_5 \cdot r_6$ | ... |
| $NewCorr_1$ | | $d_2 \cdot r_2$ | | $d_4 \cdot r_4$ | | $d_6 \cdot r_6$ ... |
| $NewCorr_2$ | $d_1 \cdot r_{2046}$ | | $d_3 \cdot r_2$ | | $d_5 \cdot r_4$ | ... |
| $NewCorr_3$ | | $d_2 \cdot r_{2046}$ | | $d_4 \cdot r_2$ | | $d_6 \cdot r_4$ ... |

| | | | | | | |
|---|---|---|---|---|---|---|
| $NewCorr_0$ | | $d_2 \cdot r_2$ | | $d_4 \cdot r_4$ | | $d_6 \cdot r_6$ ... |
| $NewCorr_1$ | $d_1 \cdot r_{2046}$ | | $d_3 \cdot r_2$ | | $d_5 \cdot r_4$ | ... |
| $NewCorr_2$ | | $d_2 \cdot r_{2046}$ | | $d_4 \cdot r_2$ | | $d_6 \cdot r_4$ ... |
| $NewCorr_3$ | $d_1 \cdot r_{2044}$ | | $d_3 \cdot r_{2046}$ | | $d_5 \cdot r_2$ | ... |

⋮

| SAMPLING TIME | ONE-CHIP PERIOD | | ONE-CHIP PERIOD | | ONE-CHIP PERIOD | | ONE-CHIP PERIOD | | ... | ONE-CHIP PERIOD | |
|---|---|---|---|---|---|---|---|---|---|---|---|
| | FIRST | SECOND | THIRD | FOURTH | FIFTH | SIXTH | | | ... | 2045-TH | 2046-TH |
| RECEIVED CODE SIGNAL | $d_1$ | $d_2$ | $d_3$ | $d_4$ | $d_5$ | $d_6$ | | | ... | $d_{2045}$ | $d_{2046}$ |
| ZEROTH CORRELATOR | $r_1$ | — | $r_3$ | — | $r_5$ | — | | | ... | $r_{2045}$ | — |
| FIRST CORRELATOR | — | $r_1$ | — | $r_3$ | — | $r_5$ | | | ... | — | $r_{2045}$ |
| SECOND CORRELATOR | $r_{2045}$ | — | $r_1$ | — | $r_3$ | — | | | ... | $r_{2043}$ | — |
| THIRD CORRELATOR | — | $r_{2045}$ | — | $r_1$ | — | $r_3$ | | | ... | — | $r_{2043}$ |
| FOURTH CORRELATOR | $r_{2043}$ | — | $r_{2045}$ | — | $r_1$ | — | | | ... | $r_{2041}$ | — |
| FIFTH CORRELATOR | — | $r_{2043}$ | — | $r_{2045}$ | — | $r_1$ | | | ... | — | $r_{2041}$ |
| ... | ... | ... | ... | ... | ... | ... | | | ... | ... | ... |

ZEROTH CORRELATION CALCULATION SET: Zeroth and First Correlator
FIRST CORRELATION CALCULATION SET: Second and Third Correlator
SECOND CORRELATION CALCULATION SET: Fourth and Fifth Correlator

FIG. 10

| SAMPLING TIME | \multicolumn{8}{c}{ONE-CHIP PERIOD} | |
|---|---|---|---|---|---|---|---|---|---|
| | FIRST | SECOND | THIRD | ... | $N$-th | $(N+1)$-TH | $(N+2)$-TH | ... |
| RECEIVED CODE SIGNAL | $d_1$ | $d_2$ | $d_3$ | ... | $d_N$ | $d_{N+1}$ | $d_{N+2}$ | ... |
| ZEROTH CORRELATOR | $r_1$ | — | — | ... | — | — | — | ... |
| FIRST CORRELATOR | — | $r_1$ | — | ... | — | $r_{N+1}$ | — | ... |
| SECOND CORRELATOR | — | — | $r_1$ | ... | — | — | — | ... |
| ... | ... | ... | ... | ... | ... | ... | ... | ... |
| $(N-1)$-TH CORRELATOR | — | — | — | ... | $r_1$ | — | — | ... |
| $N$-th CORRELATOR | $r_{1-N+NL}$ | — | — | ... | — | — | — | ... |
| $(N+1)$-TH CORRELATOR | — | $r_{1-N+NL}$ | — | ... | — | — | — | ... |

FIG. 12

ZEROTH CORRELATION CALCULATION SET  
FIRST CORRELATION CALCULATION SET  
SECOND CORRELATION CALCULATION SET

CORRELATION CALCULATING METHOD, SATELLITE SIGNAL CAPTURING METHOD, AND CORRELATION CALCULATING CIRCUIT

This application is a continuation of U.S. patent application Ser. No. 13/069,349, filed Mar. 22, 2011, and issued as U.S. Pat. No. 8,634,504, which claims priority to Japanese Patent Application Nos. 2010-065842, filed on Mar. 23, 2010 and 2010-274804, filed on Dec. 9, 2010, the entire disclosures of which are incorporated by reference herein.

BACKGROUND

1. Technical Field

The present invention relates to a correlation calculating method, a satellite signal capturing method, and a correlation calculating circuit.

2. Related Art

GPS (Global Positioning System) has become widely known as a positioning system using a positioning satellite signal and has been used for a position calculating device built in a mobile phone or a car navigation apparatus. The GPS performs a position calculating operation of calculating positional coordinates and a clock error of a position calculating device on the basis of information such as positions of plural GPS satellites or pseudo-distances from the GPS satellites to the position calculating device.

A GPS satellite signal transmitted from a GPS satellite is modulated with a spread code which is called a CA (Coarse Acquisition) code varying depending on the GPS satellites. To capture the GPS satellite signal from weak signals received, the position calculating device performs a correlation calculation on the received signal of the CA code (received code signal) and a signal of a replica code (replica code signal) which is obtained by replicating the CA code to capture the GPS satellite signal.

As a specific circuit configuration used to capture the GPS satellite signal, for example, a configuration in which plural correlators are arranged in parallel to form a correlation calculating circuit and the correlators are made to perform a correlation calculation in parallel while varying the phase of the replica code signal is used (for example, see JP-A-2001-159670).

In the related art, the correlation calculating circuit is made to perform a correlation calculation between sampled values of the received code signal sampled on the basis of the a sampling signal and sampled values of the replica code signal, for example, continuously during one period of the CA code and it is determined on the basis of the summed value thereof whether the capturing of a signal is successful. The code length of the CA code is 1023 chips. Accordingly, for example, when the sampling is carried out with a period of ½ chip of the CA code, 1023×2=2046 multiplications are necessary for the correlation calculation during one period of the CA code and it is determined on the basis of the summed value of 2046 calculated values whether the capturing of a signal is successful.

Since the CA code is a so-called gold code, the summed value is high only when the capturing of a signal is successful. Accordingly, it can be determined that the signal could be captured, that is, the phase (code phase) could be specified, when a high value is obtained by performing the same process on different phases while varying the phase of the replica code signal. The variation in phase of the replica code signal is embodied, for example, by causing sampling positions as a correlation calculation target to depart from each other one by one. For example, when the sampling is carried out with a period of ½ chip, the number of sampling positions is 2046. Therefore, when it is intended to perform the correlation calculation with one period of the CA code on all the phases, 2046×2046 multiplications are necessary.

Therefore, there is a problem in that the correlation calculation amount increases exponentially as the sampling interval is shortened. In order to shorten the sampling interval, it is also necessary to generate higher-frequency sampling signals. This causes an increase in power consumption of a circuit receiving a positioning satellite signal.

SUMMARY

An advantage of some aspects of the invention is that it provides a new technique of reducing the correlation calculation amount.

According to a first aspect of the invention, there is provided a correlation calculating method of correlating a received code signal obtained by demodulating a received signal, which is a signal obtained by receiving a positioning satellite signal, with a replica code signal, including: correlating values of the replica code signal in a chip period with values of the received code signal at first to n-th arrival times obtained by varying an arrival time of the chip period by 1/n chip (where n is an integer equal to or greater than 2); and acquiring a correlation calculation result at a 1/n chip interval by synthesizing the correlation calculation results.

According to another example of the first aspect of the invention, there is provided a correlation calculating circuit correlating a received code signal obtained by demodulating a received signal, which is a signal obtained by receiving a positioning satellite signal, with a replica code signal, including: a correlation calculating unit that correlates values of the replica code signal in a chip period with values of the received code signal at first to n-th arrival times obtained by varying an arrival time of the chip period by 1/n chip (where n is an integer equal to or greater than 2); and a synthesis unit that acquires a correlation calculation result at a 1/n chip interval by synthesizing the correlation calculation results.

According to the first aspect of the invention and the like, the values of the received code signal at the first to n-th arrival times obtained by varying the arrival time of the chip period by 1/n chip are correlated with the value of the replica code signal in the chip period. By synthesizing the correlation calculation results, the correlation calculation result at the 1/n chip interval is obtained. Accordingly, it is possible to greatly reduce the calculation amount, compared with the case where the received code signal and the replica code signal are sampled at the 1/n chip intervals and the correlation calculation is performed on all the phases in a round-robin manner. The reduction in calculation amount causes a decrease in power consumption of the entire correlation calculating circuit.

According to a second aspect of the invention, there is provided a satellite signal capturing method of capturing the positioning satellite signal using the correlation calculation results obtained by performing the correlation calculating method according to the first aspect.

According to the second aspect, it is possible to accurately and satisfactorily capture the positioning satellite signal, by capturing the positioning satellite signal using the correlation calculation result in the above-mentioned aspect.

BRIEF DESCRIPTION OF THE DRAWINGS

The invention will be described with reference to the accompanying drawings, wherein like numbers reference like elements.

FIG. 1A is a diagram illustrating a result in which sampled values "r" of a replica code signal are unified into an odd degree, FIG. 1B is a diagram illustrating an example of a combination of multiplication terms, and FIG. 1C is a diagram illustrating another example of the combination of multiplication terms.

FIG. 2A is a diagram illustrating a result in which the sampled values "r" of the replica code signal are unified into an even degree, FIG. 2B is a diagram illustrating an example of a combination of multiplication terms, and FIG. 2C is a diagram illustrating another example of the combination of multiplication terms.

FIG. 10 is a diagram obtained by diagrammatizing correlation calculation times when n=2.

FIG. 12 is a diagram obtained by diagrammatizing the correlation calculation times when n=N.

DESCRIPTION OF EXEMPLARY EMBODIMENTS

1. Principle

Figure 3:
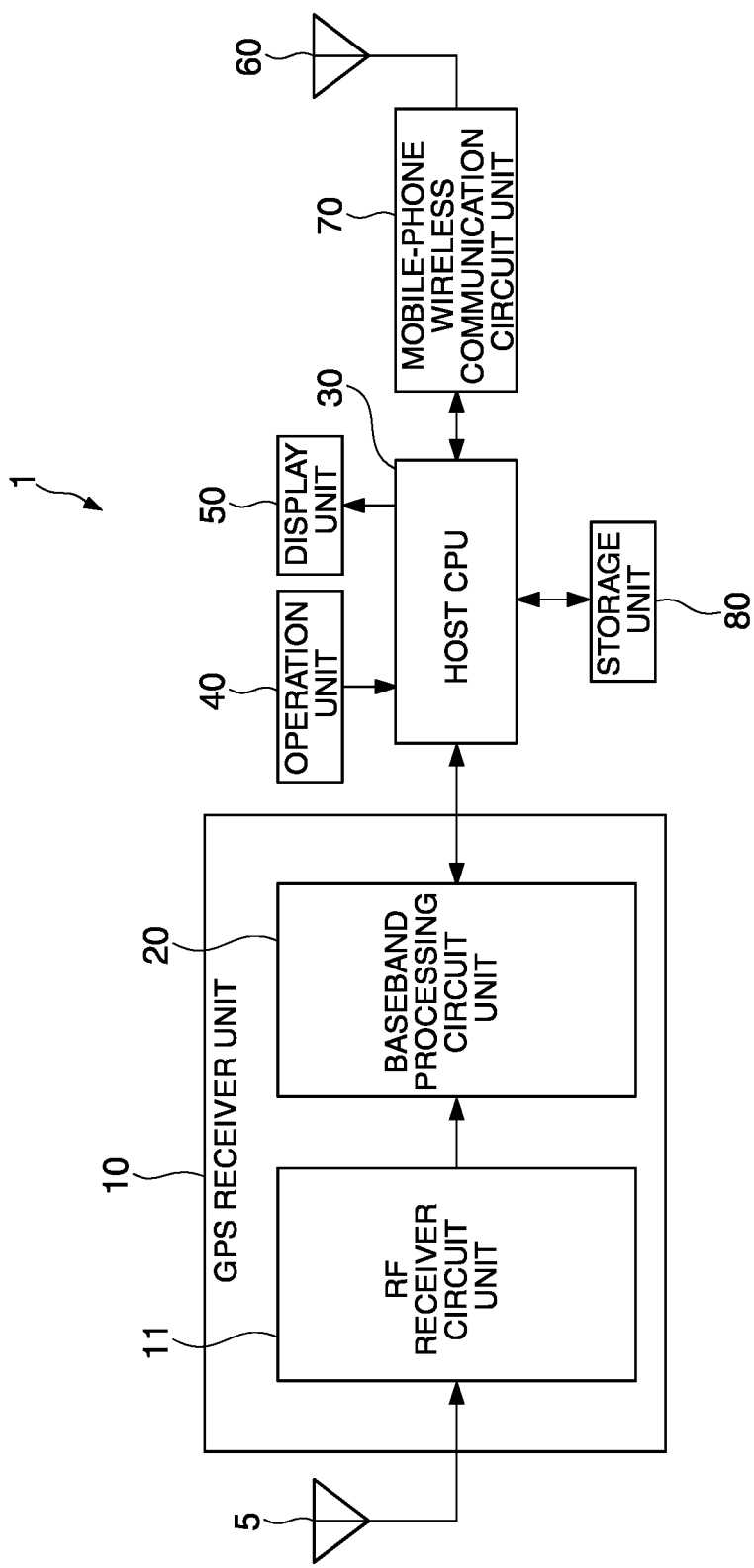
FIG. 3 is a block diagram illustrating the functional configuration of a mobile phone.

First, the principles of a correlation calculation according to embodiments of the invention will be described. In a position calculating system using GPS satellites, a GPS satellite which is a type of positioning satellite navigation message data including satellite orbit data such as an almanac or an ephemeris onto a GPS satellite signal which is a type of positioning satellite signal and transmits the resultant signal.

The GPS satellite signal is a communication signal of 1.57542 GHz modulated by a CDMA (Code Division Multiple Access) method known as a spectrum spread type using a CA (Coarse Acquisition) code which is a type of spread code. The CA code has a pseudorandom noise code with a repetition period of 1 ms using a code length of 1023 chips as 1 PN frame and varies depending on satellites.

The frequency (prescribed carrier frequency) when a GPS satellite transmits a GPS satellite signal is prescribed as 1.57542 GHz. However, the frequency when a GPS receiver receives the GPS satellite signal is not necessarily equal to the prescribed carrier frequency due to the Doppler effect resulting from the movement of the GPS satellite or the GPS receiver. Accordingly, the GPS receiver in the related art captures the GPS satellite signal by performing a frequency search which is a correlation calculation in the frequency direction for capturing a GPS satellite signal out of signals received. To specify the phase of the received GPS satellite signal (CA code), the GPS receiver captures the GPS satellite signal by performing a phase search which is a correlation calculation in the phase direction.

More specifically, the GPS receiver demodulates (detects) a received signal which is a received GPS satellite signal and correlates a received code signal which is the obtained signal of a CA code with a replica code signal which is a signal of a pseudo CA code generated in the GPS receiver.

At the time of performing the correlation calculation, for example, the received code signal and the replica code signal are sampled at sampling intervals of a 1/n chip period (where n is an integer equal to or greater than 2) of the CA code. In other words, 1023 chips which are the code length of the CA code are sampled at 1/n intervals of one chip (1/n chip interval). The sampled values of the received code signal and the sampled values of the replica code signal are correlated with each other while varying the phase of the replica code signal.

This can be expressed by Expression (1).

$$corr_i = \sum_{j=1}^{1023n} d_j \cdot r_{j-i} \quad (1)$$

Expression (1) states that the received code signal is correlated with the replica code signal of a phase later than that of the received code signal.

In Expression (1), "corr" represents a correlation value, "d" represents a sampled value of the received code signal, and "r" represents a sampled value of the replica code signal. The subscript "i" represents a correlation calculation number and the subscript "j" represents a sampling number. Since 1023 chips are sampled at 1/n chip intervals, "j=1, 2, 3, ..., 1023n".

As described in the later embodiments, when a circuit configuration is employed in which plural correlators are arranged in parallel to construct a correlation calculating circuit and each correlator correlates the received code signal with the replica code signal having different phases, the correlation calculation number "i" is a correlator number.

In this correlation calculating method, since the multiplication of the sampled value "d" of the received code signal and the sampled value "r" of the replica code signal is performed 1023×n times for each correlation calculation number "i" and is performed on 1023×n phases which varies by the 1/n chip, $(1023 \times n)^2$ multiplications are necessary and thus the calculation amount greatly increases. Accordingly, the inventor studied how to reduce the amount of correlation calculation for each correlation calculation number "i".

In order to simplify the problem, a case of "n=2" is first considered. That is, the received code signal and the replica code signal are sampled at ½-chip intervals. In this case, Expression (1) can be specifically expressed as Expression (2).

$$corr_0 = \sum_{j=1}^{2046} d_j \cdot r_{j-0} = d_1 \cdot r_1 + d_2 \cdot r_2 + \\ d_3 \cdot r_3 + \ldots + d_{2044} \cdot r_{2044} + d_{2045} \cdot r_{2045} + d_{2046} \cdot r_{2046} \\ corr_1 = \sum_{j=1}^{2046} d_j \cdot r_{j-1} = d_1 \cdot r_{2046} + d_2 \cdot r_1 + d_3 \cdot r_2 + \quad (2)$$

-continued $$corr_2 = \sum_{j=1}^{2046} d_j \cdot r_{j-2} = d_1 \cdot r_{2045} + d_2 \cdot r_{2046} + d_3 \cdot r_1 +$$

$$\ldots + d_{2044} \cdot r_{2042} + d_{2045} \cdot r_{2043} + d_{2046} \cdot r_{2044}$$

$$\vdots$$

$$corr_{2043} = \sum_{j=1}^{2046} d_j \cdot r_{j-2043} =$$

$$d_1 \cdot r_4 + d_2 \cdot r_5 + d_3 \cdot r_6 + \ldots + d_{2044} \cdot r_1 + d_{2045} \cdot r_2 + d_{2046} \cdot r_3$$

$$corr_{2044} = \sum_{j=1}^{2046} d_j \cdot r_{j-2044} =$$

$$d_1 \cdot r_3 + d_2 \cdot r_4 + d_3 \cdot r_5 + \ldots + d_{2044} \cdot r_{2046} + d_{2045} \cdot r_1 + d_{2046} \cdot r_2$$

$$corr_{2045} = \sum_{j=1}^{2046} d_j \cdot r_{j-2045} =$$

$$d_1 \cdot r_2 + d_2 \cdot r_3 + d_3 \cdot r_4 + \ldots + d_{2044} \cdot r_{2045} + d_{2045} \cdot r_{2046} + d_{2046} \cdot r_1$$

Since "n=2", "i=0, 1, 2, . . . , 2045" and "j=1, 2, 3, . . . , 2046". The calculation is performed, supposing that "j+2046" is equal to "j" (that is, the period is different but the phase is equal).

Here, since the replica code signal is sampled at ½-chip intervals, the adjacent sampled values out of the sampled values "r" of the replica code signal are equal to each other. That is, "$r_1=r_2, r_3=r_4, r_5=r_6, \ldots, r_{2045}=r_{2046}$" is established. In this case, Expression (2) can be replaced with Expression (3), for example.

$$corr_0 = d_1 \cdot r_1 + d_2 \cdot r_1 + d_3 \cdot r_3 + \quad (3)$$

$$\ldots + d_{2044} \cdot r_{2043} + d_{2045} \cdot r_{2045} + d_{2046} \cdot r_{2045}$$

$$corr_1 = d_1 \cdot r_{2045} + d_2 \cdot r_1 + d_3 \cdot r_1 + \ldots +$$

$$d_{2044} \cdot r_{2043} + d_{2045} \cdot r_{2043} + d_{2046} \cdot r_{2045}$$

$$corr_2 = d_1 \cdot r_{2045} + d_2 \cdot r_{2045} + d_3 \cdot r_1 + \ldots +$$

$$d_{2044} \cdot r_{2041} + d_{2045} \cdot r_{2043} + d_{2046} \cdot r_{2043}$$

$$\vdots$$

$$corr_{2043} =$$

$$d_1 \cdot r_3 + d_2 \cdot r_5 + d_3 \cdot r_5 + \ldots + d_{2044} \cdot r_1 + d_{2045} \cdot r_1 + d_{2046} \cdot r_3$$

$$corr_{2044} = d_1 \cdot r_3 + d_2 \cdot r_3 + d_3 \cdot r_5 + \ldots +$$

$$d_{2044} \cdot r_{2045} + d_{2045} \cdot r_1 + d_{2046} \cdot r_1$$

$$corr_{2045} = d_1 \cdot r_1 + d_2 \cdot r_3 + d_3 \cdot r_4 + \ldots +$$

$$d_{2044} \cdot r_{2045} + d_{2045} \cdot r_{2045} + d_{2046} \cdot r_1$$

From Expression (3), it can be seen that a common term in the i-th and (i+1)-th correlation calculation numbers adjacent to each other exists in terms (hereinafter, referred to as "multiplication terms") representing the multiplied value of the sampled value of the received code signal and the sampled value of the replica code signal in the right side. Paying attention to the existence of the common term, a new correlation value (hereinafter, referred to as "new correlation value") "NewCorr") is defined by Expression (4).

$$NewCorr_0 = d_1 \cdot r_1 + d_3 \cdot r_3 + \ldots + d_{2045} \cdot r_{2045} \quad (4)$$

$$NewCorr_1 = d_2 \cdot r_1 + \ldots + d_{2044} \cdot r_{2043} + d_{2046} \cdot r_{2045}$$

$$NewCorr_2 = d_1 \cdot r_{2045} + d_3 \cdot r_1 + \ldots + d_{2045} \cdot r_{2043}$$

$$\vdots$$

$$NewCorr_{2043} = d_2 \cdot r_5 + \ldots + d_{2044} \cdot r_1 + d_{2046} \cdot r_3$$

$$NewCorr_{2044} = d_1 \cdot r_3 + d_3 \cdot r_5 + \ldots + d_{2045} \cdot r_1$$

$$NewCorr_{2045} = d_2 \cdot r_3 + \ldots + d_{2044} \cdot r_{2045} + + d_{2046} \cdot r_1$$

From Expression (4), it can be seen that a new correlation value of an even degree includes a right side having only odd-degree multiplication terms but a new correlation value of an odd degree includes a right side having only even-degree multiplication terms. In addition, it can also be seen that the multiplication terms on one side of adjacent correlation calculation numbers compensate for the multiplication terms on the other side.

It can be seen from the expression that it is possible to calculate the same value as the i-th correlation value "$corr_i$" in Expression (3) by using the i-th correlation calculation result and the (i+1)-th correlation calculation result. Therefore, in case of n=2, a combination of the adjacent two (=n) correlation calculation numbers is defined as a "correlation calculation set". As a result, the correlation calculation set includes correlation calculation numbers having different sampling times. In each correlation calculation set, the correlation calculation results of the adjacent two correlation calculation numbers are synthesized.

The synthesized correlation value "CorrSet" of the i-th correlation calculation set is expressed as Expression (5).

$$CorrSet_0 = NewCorr_0 \oplus NewCorr_1 \quad (5)$$

$$CorrSet_1 = NewCorr_1 \oplus NewCorr_2$$

$$CorrSet_2 = NewCorr_2 \oplus NewCorr_3$$

$$\vdots$$

$$CorrSet_{2043} = NewCorr_{2043} \oplus NewCorr_{2044}$$

$$CorrSet_{2044} = NewCorr_{2044} \oplus NewCorr_{2045}$$

$$CorrSet_{2045} = NewCorr_{2045} \oplus NewCorr_0$$

As can be seen from Expression (4), the times of calculating the multiplication terms in the right side in the i-th correlation calculation result (time-series data) and the (i+1)-th correlation calculation result (time-series data) depart from each other one by one. This means that the sampling times of the received code signal depart from each other. Accordingly, the synthesized correlation value "CorrSet" cannot be expressed only by simply summing the correlation calculation results. Therefore, in order to clarify that the synthesized correlation value "CorrSet" is derived by summing the multiplication terms having different sampling times, the synthesis of the correlation calculation results is expressed by a mark in which "+" representing the summation is surrounded with "O" in Expression (5).

From Expression (4), it can be seen that all the sampled values "$d_1, d_2, d_3, \ldots$" sampled at the ½-chip intervals are used for the received code signal and the sampled values "$r_1, r_3, r_5, \ldots$" sampled every other sampling time are used for the replica code signal in each correlation calculation set. Therefore, this means that it is necessary to sample the received code signal at the ½-chip intervals but to sample the replica code signal at the one-chip intervals.

Writing up the above explanation, the received code signal obtained by demodulating a received signal is sampled at the ½-chip intervals in case of n=2. The replica code signal is sampled at the one-chip intervals. Two pieces (=n pieces) of time-series data having different sampling times among the time-series data of the sampled values every other (=n−1) sampling time of the received code signal are multiplied by the sampled values of the replica code signal. By synthesizing the correlation calculation result obtained from two pieces of time-series data, the correlation calculation result of the correlation calculation set is obtained.

This means that the values of the received code signal at two different arrival times (first and second arrival times) obtained by varying the arrival time of the chip period of the CA code by ½ chip are correlated with the values of the replica code signal at the chip periods. Accordingly, the first and second correlation calculation results are obtained. By synthesizing the first and second correlation calculation results, the final correlation calculation results at the ½-chip intervals are obtained.

It is described above that the correlation calculation is performed by the use of the combinations of multiplication terms shown in Expression (4), but the correlation calculation may be performed by changing the combinations of multiplication terms. Specifically, since "$r_1=r_2, r_3=r_4, r_5=r_6, \ldots,$ and $r_{2045}=r_{2046}$" are established, the even-degree sampled values in the sampled values "r" of the replica code signal may be replaced with the odd-degree sampled values or the odd-degree sampled values may be replaced with the even-degree sampled values.

FIGS. 1A to 1C are diagrams illustrating an example where the sampled values "r" of the replica code signal are unified into the odd degrees. FIG. 1A shows an example where the multiplication terms of the sampled values "d" of the received code signal and the sampled values "r" of the replica code signal included in the expression of calculating the correlation values "corr" shown in Expression (2) are arranged in the order corresponding to the calculation expressions and the even-degree sampled values "$r_{2m}$" are replaced with the odd-degree sampled values "$r_{2m-1}$".

It can be seen from FIG. 1A that the sampled values "r" of the replica code signal are unified into the odd degree. It can also be seen from the multiplication terms that pairs of multiplication terms surrounded with rectangular dashed lines are pairs of common terms. In this case, by deleting the upper common term of each pair of common terms, it is possible to obtain the combinations of multiplication terms shown in FIG. 1B. By deleting the lower common term of each pair of common terms, it is possible to obtain the combinations of multiplication terms shown in FIG. 1C.

FIGS. 2A to 2C are diagrams illustrating an example where the sampled values "r" of the replica code signal are unified into the even degrees. The viewpoint of the drawings is the same as FIGS. 1A to 1C. FIG. 2A shows an example where the odd-degree sampled values "$r_{2m-1}$" are replaced with the even-degree sampled values "$r_{2m}$". In this case, it can be seen that pairs of multiplication terms surrounded with rectangular dashed lines are pairs of common terms. By deleting the upper common term of each pair of common terms, it is possible to obtain the combinations of multiplication terms shown in FIG. 2B. By deleting the lower common term of each pair of common terms, it is possible to obtain the combinations of multiplication terms shown in FIG. 2C.

By calculating the new correlation values "NewCorr" using one of the above-mentioned four combinations, it is possible to implement the correlation calculating method according to this embodiment. For example, in the combinations shown in FIGS. 1B and 2B, the combination of new correlation values for obtaining the i-th synthesized correlation value "CorrSet," is a combination of the i-th new correlation value "NewCorr$_i$" and the (i+1)-th new correlation value "NewCorr$_{i+1}$". In the combinations shown in FIGS. 1C and 2C, the combination of new correlation values for obtaining the i-th synthesized correlation value "CorrSet," is a combination of the (i−1)-th new correlation value "NewCorr$_{i-1}$" and the i-th new correlation value "NewCorr$_i$".

Since the sampled values of the replica code signal can be unified into any one of the odd degree and the even degree, the following is possible. That is, two pieces of time-series data having different sampling times as the time-series data of every other sampled value when the received code signal is sampled at the ½-chip intervals are correlated with any one piece of time-series data of the time-series data (the even-degree time-series data and the odd-degree time-series data) of every other sampled value when the replica code signal is sampled at the same sampling intervals. Then, as described above, the correlation calculation results of the adjacent correlation calculation numbers are synthesized.

The example of "n=2" has hitherto been described, but this example can be generalized for an example of "n=n". When the code length of the spread code of the positioning satellite signal is indicated by "L", the new correlation value "NewCorr$_h$" of the h-th correlation calculation number is expressed as Expression (6).

$$NewCorr_h = \sum_{s=1}^{L} d_1 \cdot r_j \tag{6}$$

The synthesized correlation value "CorrSet$_k$" of the k-th correlation calculation number is expressed as Expression (7).

$$CorrSet_k = \sum_{r=1}^{n} NewCorr_h \tag{7}$$

Here, "k" is the number of the synthesized correlation value "CorrSet" and satisfies "0≤k<L·n". "h" is the number of the new correlation value "NewCorr" and satisfies both "0≤h<L·n" and Expression (8).

$$h = \begin{cases} k+r-1 & \text{if } k+r-1 < L \cdot n \\ k+r-1-L \cdot n & \text{else} \end{cases} \tag{8}$$

Here, "i" is the sampling number of the received code signal and satisfies both "0<i≤L·n" and Expression (9).

$$i = \begin{cases} (s-1) \cdot n + 1 + u & \text{if} (s-1) \cdot n + 1 + u > 0 \\ (s-1) \cdot n + 1 + u + L \cdot n & \text{else} \end{cases} \tag{9}$$

Here, "u" is a remainder when "h" is divided by "n".

"j" is the sampling number of the replica code signal and satisfies both "0<j≤L·n" and Expression (10).

$$j = \begin{cases} (s-t+1)\cdot n + 1 & \text{if}(s-t+1)\cdot n + 1 > 0 \\ (s-t+1)\cdot n + 1 + L\cdot n & \text{else} \end{cases} \quad (10)$$

Here, "t" is a quotient when "h" is divided by "n".

In this case, it is also necessary to sample the received code signal at 1/n-chip intervals, but the replica code signal is sampled at the one-chip intervals.

In this case, the sampled values "r" of the replica code signal satisfies the relations "$r_1=r_2=r_3= \ldots =r_n$ and $r_{n+1}=r_{n+2}=r_{n+3}= \ldots =r_{2n}, \ldots$". By using these relations, it is possible to acquire plural sets of time-series data of the sampled values of the replica code signal, similarly to the case of "n=2". Accordingly, any one piece of time-series data of the sampled values of every n−1 sampling times when the replica code signal is sampled at the 1/n-chip intervals may be correlated with the time-series data of the sampled values of the received code signal.

The calculation amount of the correlation calculation method according to this embodiment will be described. In the correlation calculation method according to this embodiment, the number of multiplications of the sampled values "r" of the replica code signal by the sampled values "d" of the received code signal and the number of summations of summing the multiplication terms are "1/n" times. Therefore, the calculation amount in the correlation calculation method according to this embodiment is $1/n^2$ times that in the correlation calculation method according to the related art. For example, in the case of "n=2", the calculation amount is "¼" times that in the correlation calculation method according to the related art.

2. Embodiments

Embodiments where the invention is applied to a mobile phone which is a kind of electronic apparatus having a position calculating device including a correlation calculating circuit will be described below. However, the invention is not limited to the below-described embodiments.

First Embodiment 2-1. Functional Configuration

FIG. 3 is a block diagram illustrating the functional configuration of a mobile phone 1 according to a first embodiment of the invention. The mobile phone 1 includes a GPS antenna 5, a GPS receiver unit 10, a host CPU (Central Processing Unit) 30, an operation unit 40, a display unit 50, a mobile-phone antenna 60, a mobile-phone wireless communication circuit unit 70, and a storage unit 80.

The GPS antenna 5 is an antenna that receives an RF (Radio Frequency) signal including a GPS satellite signal transmitted form a GPS satellite and outputs the received signal to the GPS receiver unit 10.

The GPS receiver unit 10 is a position calculating circuit or a position calculating device measuring the position of the mobile phone 1 on the basis of the signal output from the GPS antenna 5 and is a functional block corresponding to a so-called GPS receiver. The GPS receiver unit 10 includes an RF receiver circuit unit 11 and a baseband processing circuit unit 20. The RF receiver circuit unit 11 and the baseband processing circuit unit 20 may be manufactured as individual LSI (Large Scale Integration) chips or a single chip.

The RF receiver circuit unit 11 is a circuit receiving an RF signal. Regarding the circuit configuration, for example, a receiver circuit converting the RF signal output from the GPS antenna 5 into a digital signal by the use of an A/D converter and processing the digital signal may be constructed. A receiver circuit processing the RF signal output from the GPS antenna 5 as an analog signal, finally converting the analog signal into a digital signal, and outputting the digital signal to the baseband processing circuit unit 20 may be constructed.

In the latter, for example, the RF receiver circuit 11 can be constructed as follows. That is, by dividing or multiplying a predetermined oscillation signal, an oscillation signal for multiplying an RF signal is generated. The generated oscillation signal is multiplied by the RF signal output from the GPS antenna 5 to down-convert the RF signal into a signal of an intermediate frequency (hereinafter, referred to as "IF signal"), the IF signal is amplified, the amplified signal is converted into a digital signal by the use of A/D converter, and the resultant digital signal is output to the baseband processing circuit unit 20.

The baseband processing circuit unit 20 is a processing circuit block performing a correlation calculating process on the received signal output from the RF receiver circuit unit 11 to capture a GPS satellite signal and performing a predetermined position calculating process on the basis of satellite orbit data or time data extracted from the GPS satellite signal to calculate the position (positional coordinate) of the mobile phone 1. The baseband processing circuit unit 20 includes a correlation calculating circuit performing the correlation calculating process on the received signal and a GPS satellite signal capturing circuit capturing the GPS satellite signal on the basis of the correlation calculation result of the correlation calculating circuit.

Figure 4:
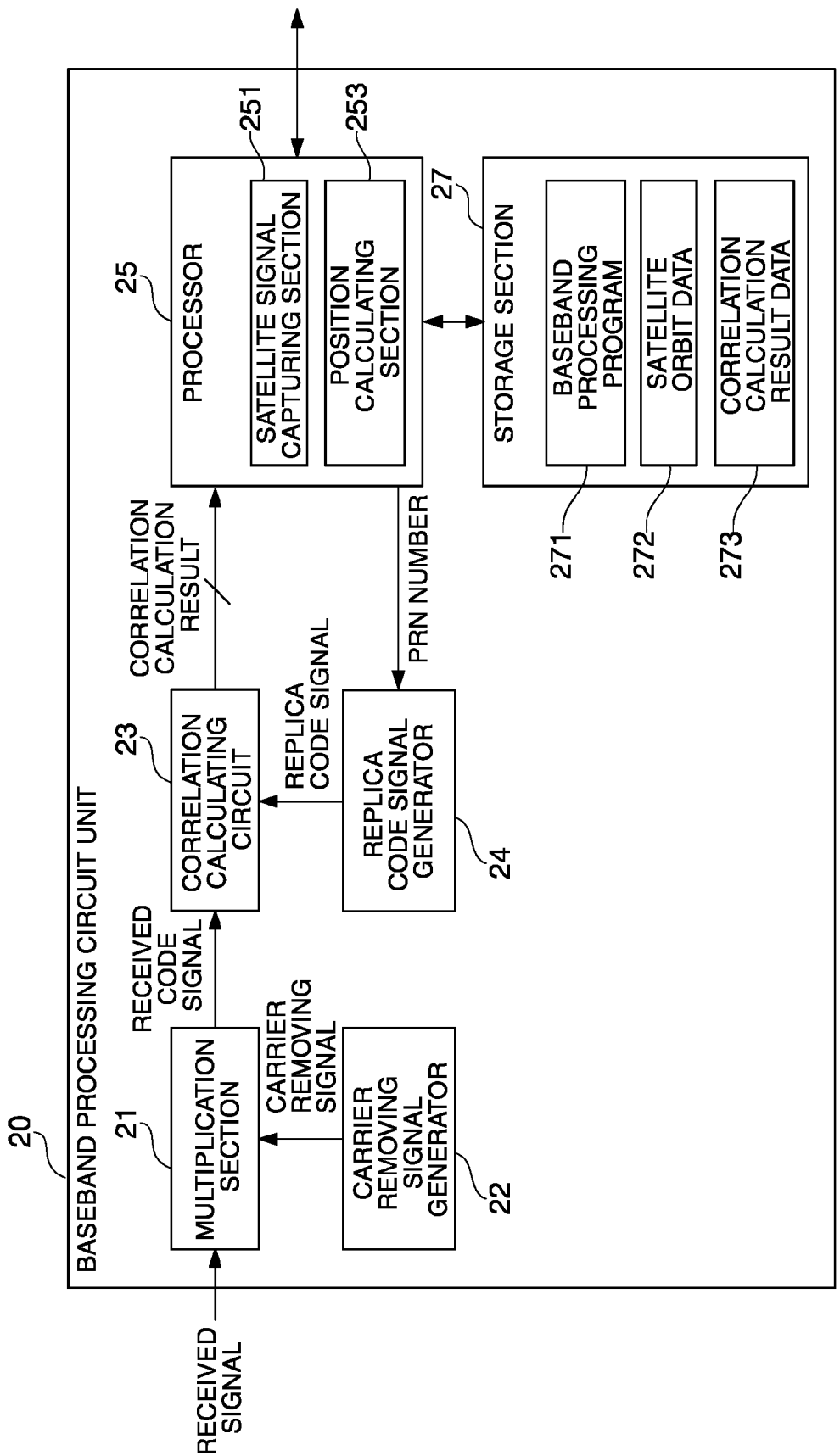
FIG. 4 is a block diagram illustrating the circuit configuration of a baseband processing circuit unit.

FIG. 4 is a diagram illustrating the circuit configuration of the baseband processing circuit unit 20, where the circuit blocks involved in this embodiment are mainly shown. The baseband processing circuit 20 includes a multiplication section 21, a carrier removing signal generator 22, a correlation calculating circuit 23, a replica code signal generator 24, a processor 25, and a storage section 27.

The multiplication section 21 is a circuit section removing carrier waves (carriers) from the received signal by multiplying the received signal by a carrier removing signal generated by the carrier removing signal generator 22 and includes, for example, a multiplier. The received code signal from which the carrier waves are removed is output to the correlation calculating circuit 23 from the multiplication section 21.

The carrier removing signal generator 22 is a circuit generating a carrier removing signal of the same frequency as the frequency of the carrier signal of the GPS satellite signal and includes an oscillator such as a carrier NCO (Numerical Controlled Oscillator). When the signal output from the RF receiver circuit unit 11 is an IF signal, the carrier removing signal of the IF frequency is generated. In this way, even when the RF receiver circuit unit 11 down-converts the received signal into an IF signal, this embodiment can be applied substantially similarly.

By multiplying the received signal by the carrier removing signal generated from the carrier removing signal generator 22 by the use of the multiplication section 21, the received signal is demodulated (detected) and the received code signal from which the carrier waves (carriers) are removed is generated and output. Accordingly, the multiplier 21 and the carrier removing signal generator 22 can also be called as a demodulator (detector).

The correlation calculating circuit 23 is a correlation calculating circuit correlating the received code signal output from the multiplication section 21 with the replica code signal output from the replica code signal generator 24, and is a significant circuit block in this embodiment as described later.

The replica code signal generator 24 is a circuit unit generating the replica code (replica CA code) signal obtained by replicating the CA code (which is a spread code of the GPS satellite signal and includes an oscillator such as a code NCO. The replica code signal generator 24 generates the replica code signal corresponding to a PRN number (satellite number) instructed by the processor 25 and outputs the generated replica code signal to the correlation calculating circuit 23.

The correlation calculating circuit 23 correlates I and Q components of the received signal with the replica code signal input from the replica code signal generator 24. Although a circuit block separating the I and Q components of the received signal (I and Q separation) is not shown, the circuit block may be constructed in any way. For example, when the RF receiver circuit unit 11 down-converts the received signal into an IF signal, the I and Q separation may be performed by multiplying the received signal by a local oscillation signal having a phase different by 90 degrees.

Figure 5:
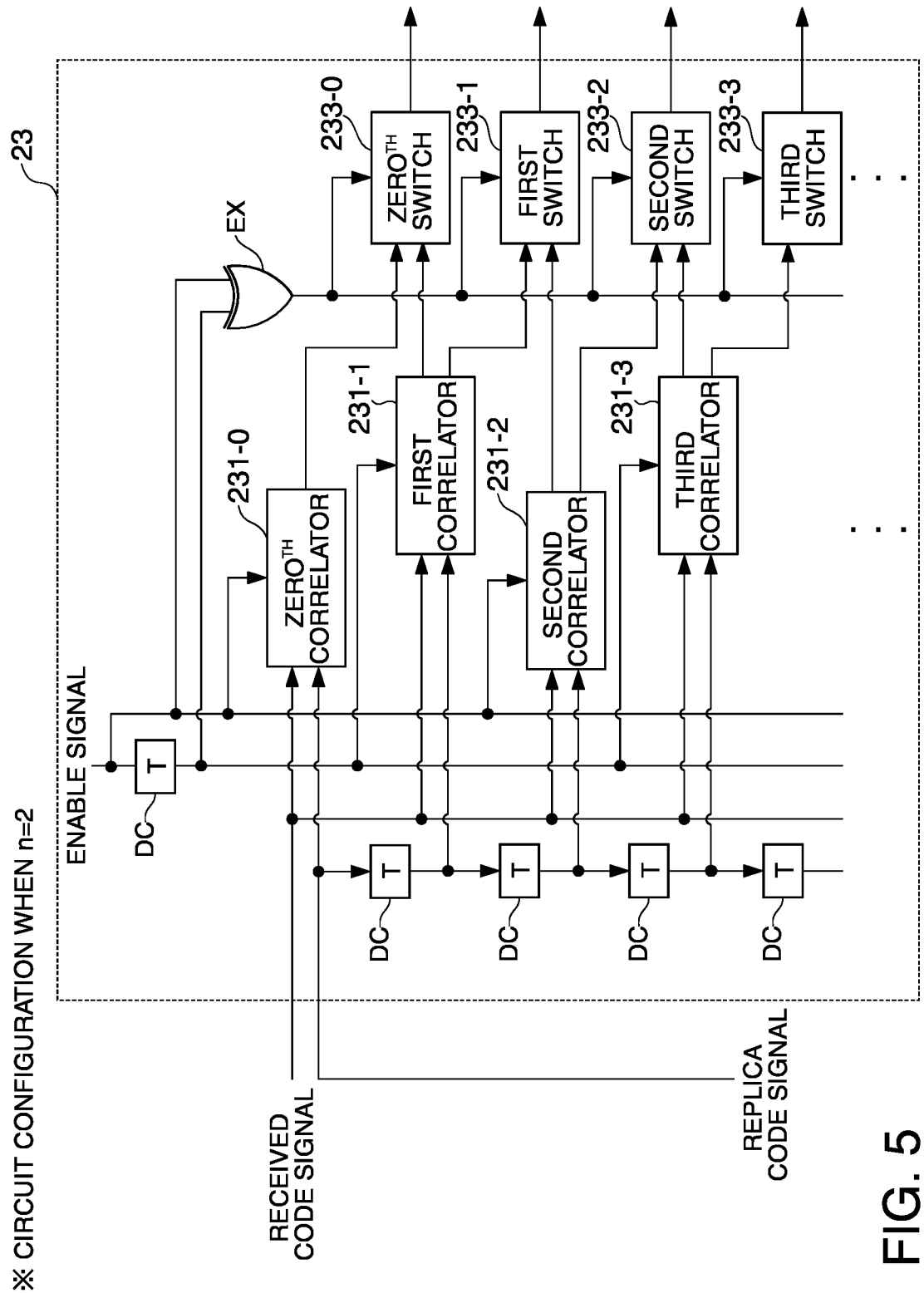
FIG. 5 is a diagram illustrating the circuit configuration of a correlation calculating circuit of a first type when n=2.

FIG. 5 is a diagram illustrating the circuit configuration of the correlation calculating circuit 23. The correlation calculating circuit 23 shown in FIG. 5 has a circuit configuration corresponding to the case of n=2. In this example, the correlation calculating circuit performs the correlation calculating process by sampling the received code signal at the ½-chip intervals (corresponding to 1/n of the chip period) in accordance with an enable signal of a chip period and sampling the replica code signal at the one-chip intervals (corresponding to the chip period).

The correlation calculating circuit 23 according to the first embodiment includes plural correlators 231 (a zeroth correlator 231-0, a first correlator 231-1, a second correlator 231-2, a third correlator 231-3, . . . ) as a correlation calculating section, plural switches 233 (a zeroth switch 233-0, a first switch 233-1, a second switch 233-2, a third switch 233-3, . . . ) as a synthesis section, plural delay circuits DC, and an EXOR (Exclusive OR) circuit EX.

The correlators 231 are a correlation calculating section sampling and multiplying the received code signal and the replica code signal in accordance with the enable signal and include, for example, a multiplier. The received code signal is input to the respective correlators 231. The replica code signal delayed by a delay of "mT" by plural stages of delay circuits DC is input to the m-th (where m=0, 1, 2, . . . ) correlator 231-m. The signal is delayed by "T" by one delay circuit DC. "T" represents the sample interval of the received code signal and "T=½ chip" herein.

More specifically, the replica code signal with a delay of "0" is input to the zeroth correlator 231-0, the replica code signal with a delay of "T=½ chip" is input to the first correlator 231-1, the replica code signal with a delay of "2T=one chip" is input to the second correlator 231-2, and the replica code signals delayed by a delay of "T" are input to the correlators, respectively. Each correlator performs the correlation calculating process on the sampled values obtained by sampling the received code signal and the sampled values obtained by sampling the replica code signal.

The enable signal with a delay of "0" (hereinafter, referred to as "first enable signal") is input to the even-degree correlators 231-2m and the enable signal with a delay of "T=½ chip" (hereinafter, referred to as "second enable signal") is input to the odd-degree correlators 231-(2m+1). That is, the enable signals having different delays by "T" are input to the even-degree and odd-degree correlators.

The even-degree correlators 231-2m perform the sampling and the multiplying at the chip periods (=one-chip intervals) in accordance with the first enable signal. Similarly, the odd-degree correlators 231-(2m+1) perform the sampling and the multiplying at the chip periods (=one-chip intervals) in accordance with the second enable signal. On the contrary, the received code signals having no temporal difference (having the same phase) are input in parallel to the correlators 231. Accordingly, the received code signal is alternately sampled and multiplied at the ½-chip intervals by a set of two adjacent correlators 231 (correlation calculation set). On the contrary, the replica code signal is delayed by ½ chip and is input to the correlators 231. Accordingly, the replica code signal is sampled and multiplied at the one-chip intervals by the correlators 231.

In this case, in case of n=2, the values of the received code signal at first and second arrival times obtained by varying the arrival time of a chip period by the ½ chip are correlated with the values of the replica code signal at the chip periods in accordance with the first and second enable signals.

On the other hand, the first enable signal and the second enable signal are input to the EXOR circuit EX. The enable signals are doubled by the EXOR circuit EX. The output signal of the EXOR circuit EX is input in parallel to the switches 233. That is, the enable signals for activating the switches 233 at the ½-chip intervals (=½ of the chip period) are generated by the EXOR circuit EX and are input to the switches 233.

The output signals of two successive correlators 231 are input to each switch 233. That is, the output signals of the zeroth correlator 231-0 and the first correlator 231-1 are input to the zeroth switch 233-0, the output signals of the first correlator 231-1 and the second correlator 231-2 are input to the first switch 233-1, and the output signals of the m-th correlator 231-m and the (m+1)-th correlator 231-(m+1) are input to the m-th switch 233-m.

Each switch 233 is a switching circuit sequentially switching the output signals from two correlators in accordance with the output signal of the EXOR circuit EX and is embodied by a logical circuit such as a flip-flop circuit. The switches 233 are a synthesis section synthesizing the correlation calculation results of the corresponding two correlators by sequentially switching and outputting the output signals of the two correlators. More specifically, each switch 233 sequentially switches the multiplication results output from the two adjacent correlators 231 at the ½-chip intervals in accordance with the enable signal doubled by the EXOR circuit EX and outputs the resultant signal to the processor 25.

Figure 6:
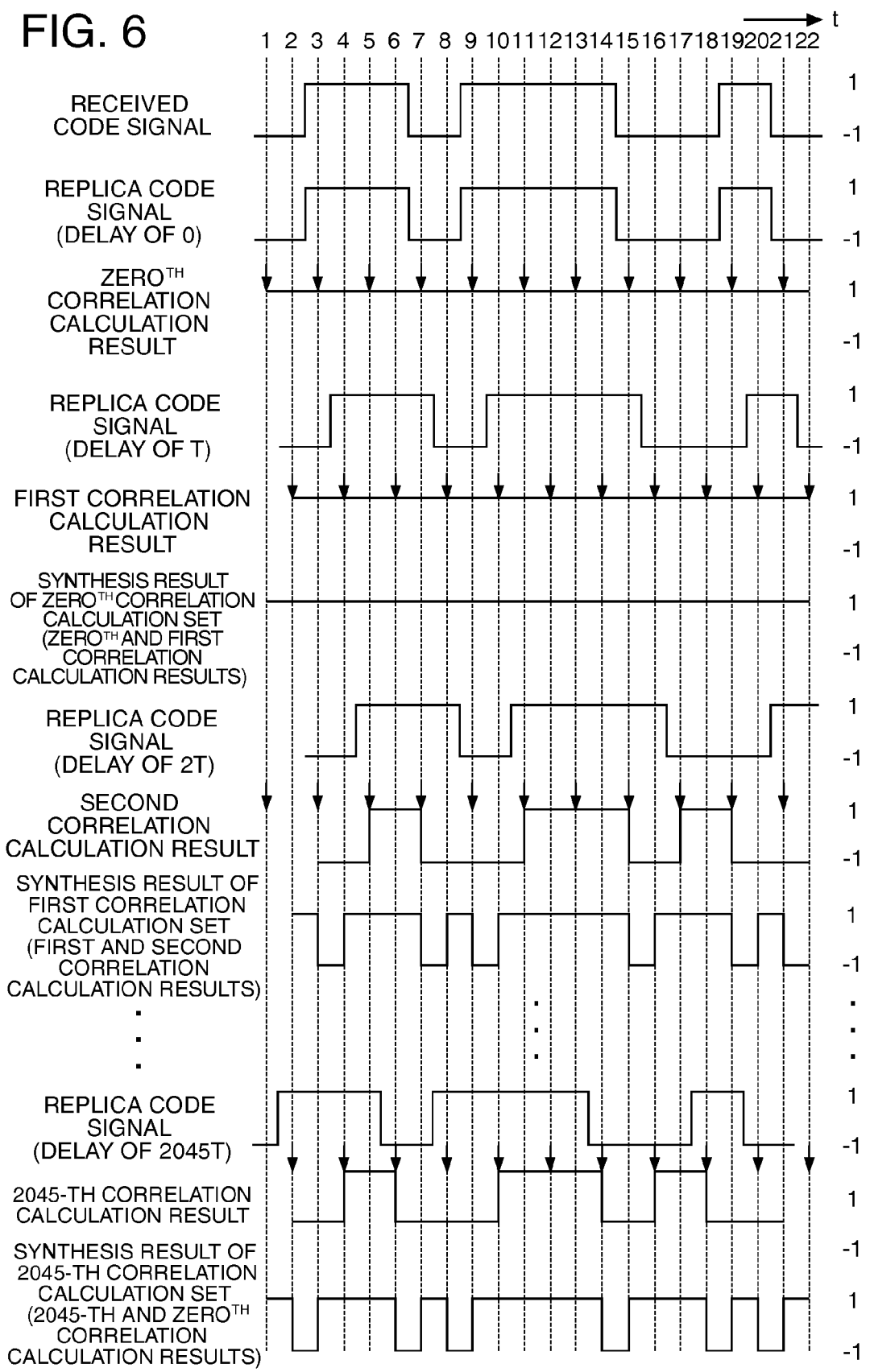
FIG. 6 is a timing diagram illustrating a correlation calculation when n=2.

FIG. 6 is a timing diagram illustrating the operations of the elements of the correlation calculating circuit 23. FIG. 6 shows an example where the correlation calculating process is performed by the use of the combination shown in FIG. 1B. Since n=2, the sampling number corresponds to the ½-chip interval number. For the purpose of intuitively understanding, the received code signal, the replica code signal, the correlation calculation result, and the synthesis result of the correlation calculation result are expressed by two values of "1" and "−1".

An example of the time-series data of the received code signal is shown in the uppermost. The horizontal axis represents the time and the number described in the uppermost represents the sampling number of the received code signal. Here, it is assumed that the PRN number (satellite number) and the phase of the received code signal are known.

The replica code signal with a delay of "0" is shown in the second stage. The replica code signal and the received code signal are input to the zeroth correlator 231-0 and the correlation calculation process is carried out at the one-chip intervals in accordance with the first enable signal therein.

When the sampled value of the received code signal and the sampled value of the replica code signal at each sampling time are equal to each other (when both are "1" or "−1"), the correlation calculation result becomes "1" by the multiplication of the sampled values. On the contrary, when the sampled value of the received code signal and the sampled value of the replica code signal are different from each other (when one is "1" and the other is "−1"), the correlation calculation result becomes "−1" by the multiplication of the sampled values.

Since the received code signal at the uppermost stage and the replica code signal at the second stage are equal to each other in phase (delay=0), the sampled value of the received code signal and the sampled value of the replica code signal at each sampling time are equal to each other. Accordingly, the correlation calculation results at all the sampling times become "1". As a result, the zeroth correlation calculation result described in the third stage is calculated and is output to the zeroth switch 233-0. The arrow marked above the correlation calculation result represents the sampling time.

The replica code signal with a delay of "T=½ chip" is shown in the fourth stage. The replica code signal and the received code signal are input to the first correlator 231-1 and the correlation calculating process is performed at the one-chip intervals in accordance with the second enable signal therein.

The fourth-stage replica code signal is later in phase by the ½ chip than the uppermost-stage received code signal (delay=½ chip). Comparing the sampled value of the received code signal and the sampled value of the replica code signal at each sampling time with each other in time series, since both sampled values are "−1" at the sampling time of time "t=2", the correlation calculation result is "(−1)×(−1)=1". At the sampling times of time "t=4" and "t=6", since both sampled values are "1", the correlation calculation result is "1×1=1". At the sampling time of "t=8", since both sampled values are "−1" at the sampling time of time "t=2", the correlation calculation result is "(−1)×(−1)=1". In this way, the correlation calculation results at all the sampling times become "1". As a result, the first correlation calculation result shown in the fifth stage and is output to the zeroth switch 233-0 and the first switch 233-1.

Here, the first enable signal and the second enable signal have a period of one chip and are different from each other by ½ chip. Accordingly, the zeroth correlator 231-0 and the first correlator 231-1 alternately perform the sampling and the correlation calculation every ½ chip.

The zeroth switch 233-0 alternately selects and outputs the outputs of the zeroth correlator 231-0 and the first correlator 231-1 every ½ chip in accordance with the output signal of the EXOR circuit EX. Specifically, the zeroth switch 233-0 is synchronously controlled on the basis of the enable signal so as to select the output of the zeroth correlator 231-0 when the output signal of the zeroth correlator 231-0 varies and to select the output signal of the first correlator 231-1 when the output signal of the first correlator 231-1 varies. As a result, the synthesis result output from the zeroth switch 233-0 is the correlation calculation result of the zeroth correlation calculation set.

The synthesis result of the zeroth correlation calculation set is obtained by synthesizing the zeroth correlation calculation result in the third stage and the first correlation calculation result in the fifth stage. Since the zeroth correlation calculation result and the first correlation calculation result depart from each other in sampling time by the ½ chip, the correlation calculation results are synthesized by alternately selecting two correlation calculation results. In this case, the zeroth correlation calculation result is "1" at all the sampling times and the first correlation calculation result is also "1" at all the sampling times. Therefore, by alternately selecting the correlation calculation results, the correlation calculation results are "1" at all the sampling times and the synthesis result of the zeroth correlation calculation set having a linear shape shown in the sixth stage is obtained.

The replica code signal with a delay of "2T=one chip" is shown in the seventh stage. The replica code signal and the received code signal are input to the second correlator 231-2 and the correlation calculation process is performed at the one-chip intervals in accordance with the first enable signal therein. As a result, the second correlation calculation result shown in the eighth stage is calculated and is output to the first switch 233-1 and the second switch 233-2.

The first switch 233-1 alternately selects and outputs the outputs of the first correlator 231-1 and the second correlator 231-2 at the ½-chip intervals in accordance with the output signal of the EXOR circuit EX. Accordingly, the synthesis result of the correlation calculation result shown in the ninth state and is output from the first switch 233-1. The synthesis result output from the first switch 233-1 is the correlation calculation result of the first correlation calculation set.

The synthesis result of the first correlation calculation set is obtained by synthesizing the first correlation calculation result in the fifth stage and the second correlation calculation result in the eighth stage. In this case, by alternately selecting the correlation calculation results, since the synthesis result falls to "−1" at the sampling time when the second correlation calculation result is "−1" and rises to "1" at the subsequent sampling time of the first correlation calculation result, the synthesis result of the first correlation calculation set shown in the ninth stage is obtained.

In this way, since the output signals from the two adjacent correlators 231 are switched by the switches 233 for each correlation calculation set, the correlation calculation result is synthesized and the synthesis result is output from the switches 233.

In FIG. 6, the synthesis result at all the sampling time is "1" only in the synthesis result of the zeroth correlation calculation set. Therefore, when the synthesis results at all the sampling times are summed for each of the zeroth to 2045-th correlation calculation sets to calculate the correlation values, the correlation value of the zeroth correlation calculation set is the maximum. Accordingly, it can be determined that the replica code signal with a delay of "0" corresponding to the zeroth correlation calculation set is the replica code signal equal to the received code signal in phase.

Figure 7:
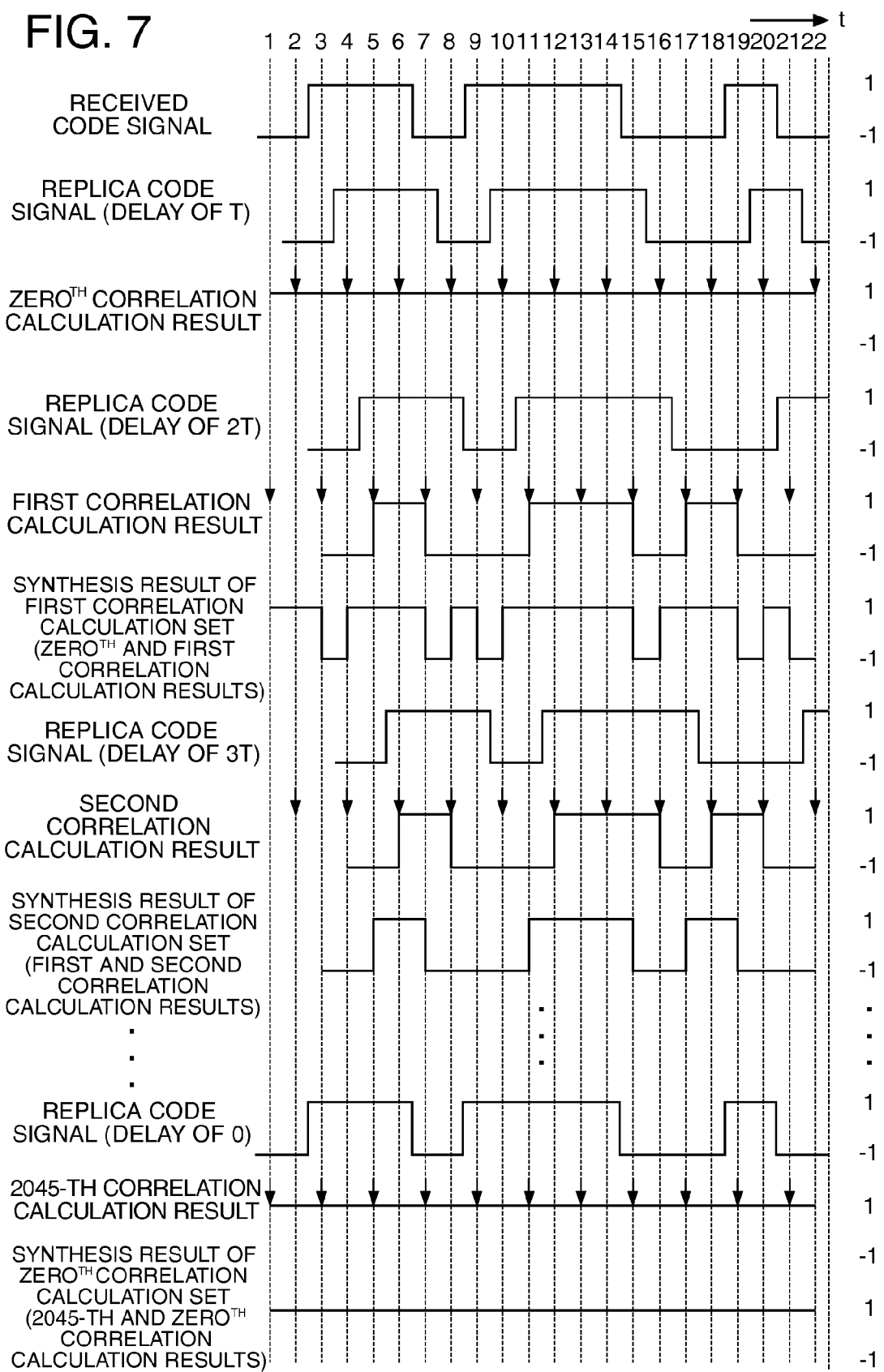
FIG. 7 is a timing diagram illustrating the correlation calculation when n=2.
Figure 8:
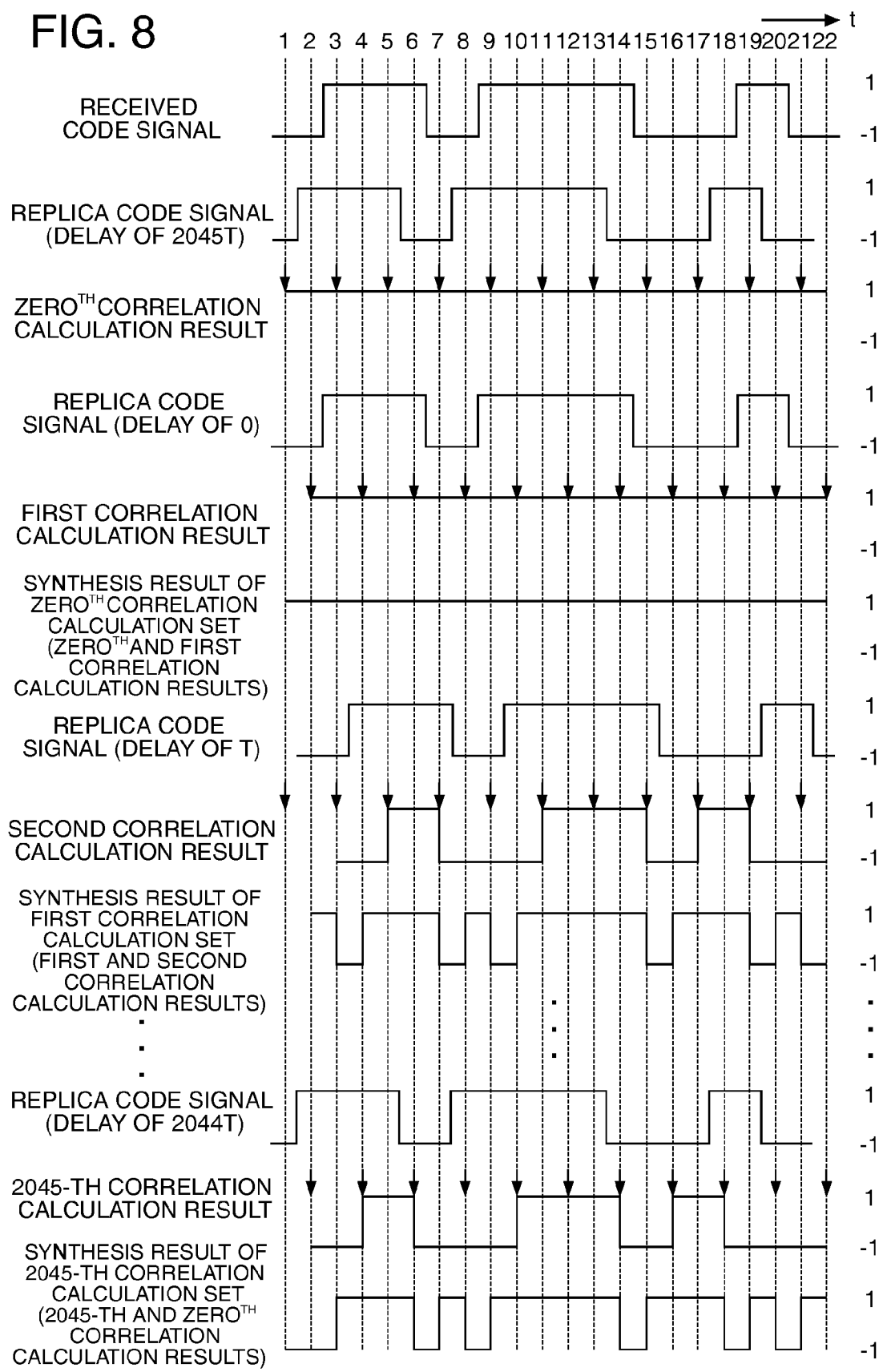
FIG. 8 is a timing diagram illustrating the correlation calculation when n=2.
Figure 9:
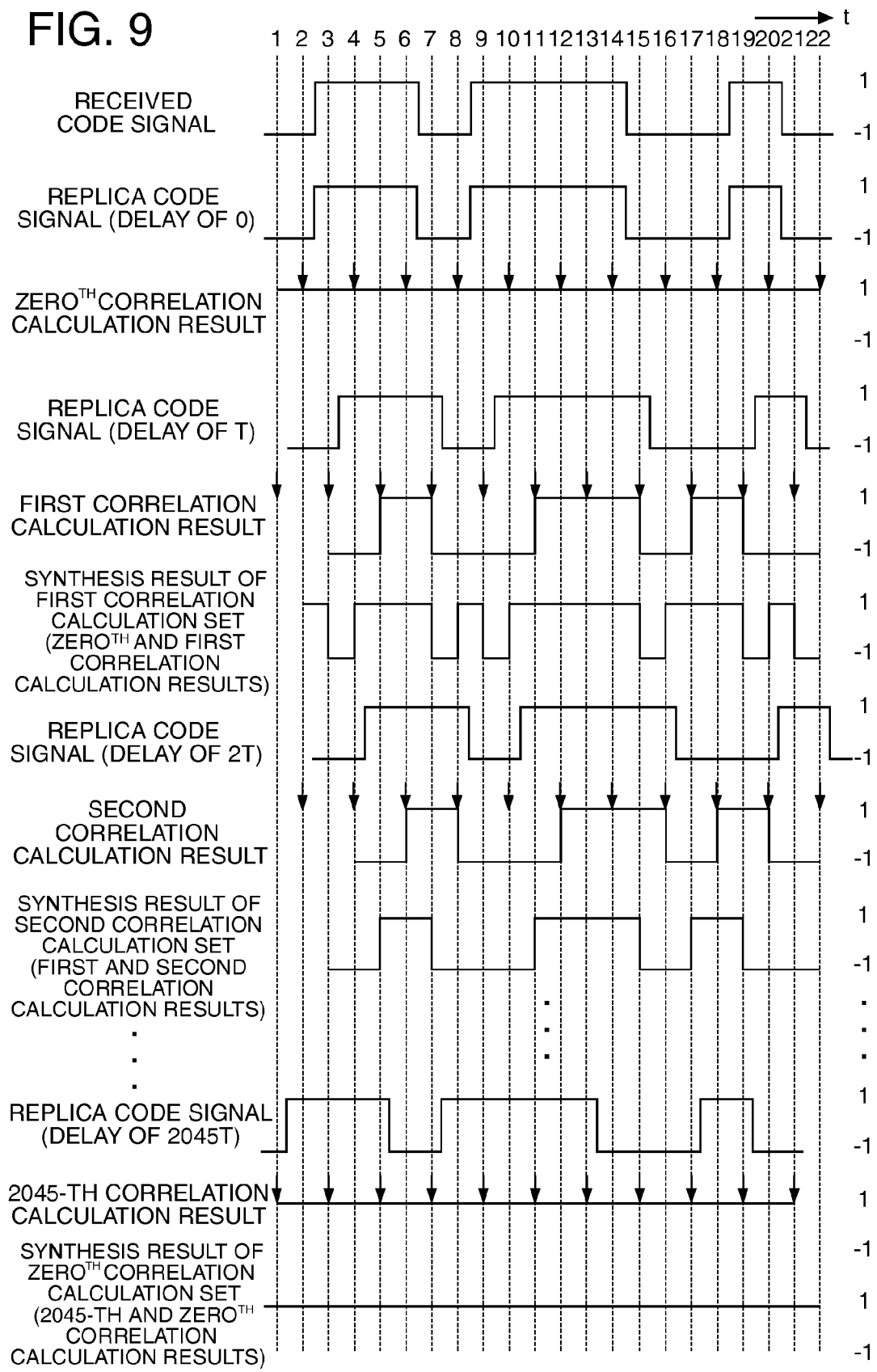
FIG. 9 is a timing diagram illustrating the correlation calculation when n=2.

The timing diagrams of the other combinations shown in FIGS. 1A to 1C and FIGS. 2A to 2C are drawn in the same way. The timing diagrams corresponding to the combinations of FIG. 1C, FIG. 2B, and FIG. 2C, respectively, are shown in FIGS. 7 to 9. As described in the principle, the combination of the new correlation values "NewCorr" for obtaining the synthesized correlation values "CorrSet" is the combination of the i-th new correlation value "NewCorr$_i$" and the (i+1)-th new correlation value "NewCorr$_{i+1}$" in the combinations shown in FIGS. 1B and 2B. In the combinations shown in FIGS. 1C and 2C, the combination of new correlation values is the combination of the (i−1)-th new correlation value "NewCorr$_{i-1}$" and the i-th new correlation value "NewCorr$_i$". Therefore, the corresponding timing diagrams will be compared.

Comparing FIGS. 6 and 8 corresponding to the combinations shown in FIGS. 1B and 2B with each other, it can be seen that the zeroth correlation calculation set in which the zeroth correlation calculation result and the first correlation calculation result are synthesized is a combination having the maximum correlation value. On the other hand, comparing FIGS. 7 and 9 corresponding to the combinations shown in FIGS. 1C and 2C with each other, it can be seen that the zeroth correlation calculation set in which the 2045-th correlation calculation result and the zeroth correlation calculation result are synthesized is a combination having the maximum correlation value. In any combination, it can be sent that the combination corresponding to the replica code signal with a delay of "0" is obtained, which is a correct result.

FIG. 10 is a graph obtained by diagrammatizing the correlation calculating times when n=2 and corresponds to the timing diagram shown in FIG. 6. The horizontal axis in the graph represents the sampling time of the received code signal and the sampled value of the received code signal. The sampling times vary by "T=½ chip". Since n=2, two successive sampling times correspond to the one-chip period. On the other hand, the vertical axis in the graph represents the numbers of correlators 231. Since n=2, two successive correlators constitute a correlation calculation set. The sampled values of the replica code signal are described at the sampling times when the correlation calculating process is performed and "−" is marked at the sampling times when the correlation calculating process is not performed.

At the first sampling time, the even-degree correlators 231-2$m$ perform the correlation calculation process on the sampled values "d" of the received code signal and the sampled values "r" of the replica code signal. For example, the zeroth correlator 231-0 correlates "$r_i$" with "$d_1$", the second correlator 231-2 correlates "$r_{2045}$" with "$d_1$", and the fourth correlator correlates 231-4 "$r_{2043}$" with "$d_1$".

At the second sampling time, the odd-degree correlators 231-(2$m$+1) perform the correlation calculation process on the sampled values "d" of the received code signal and the sampled values "r" of the replica code signal. For example, the first correlator 231-1 correlates "$r_1$" with "$d_2$", the third correlator 231-3 correlates "$r_{2045}$" with "$d_2$", and the fifth correlator 231-5 correlates "$r_{2043}$" with "$d_2$".

Figure 11:
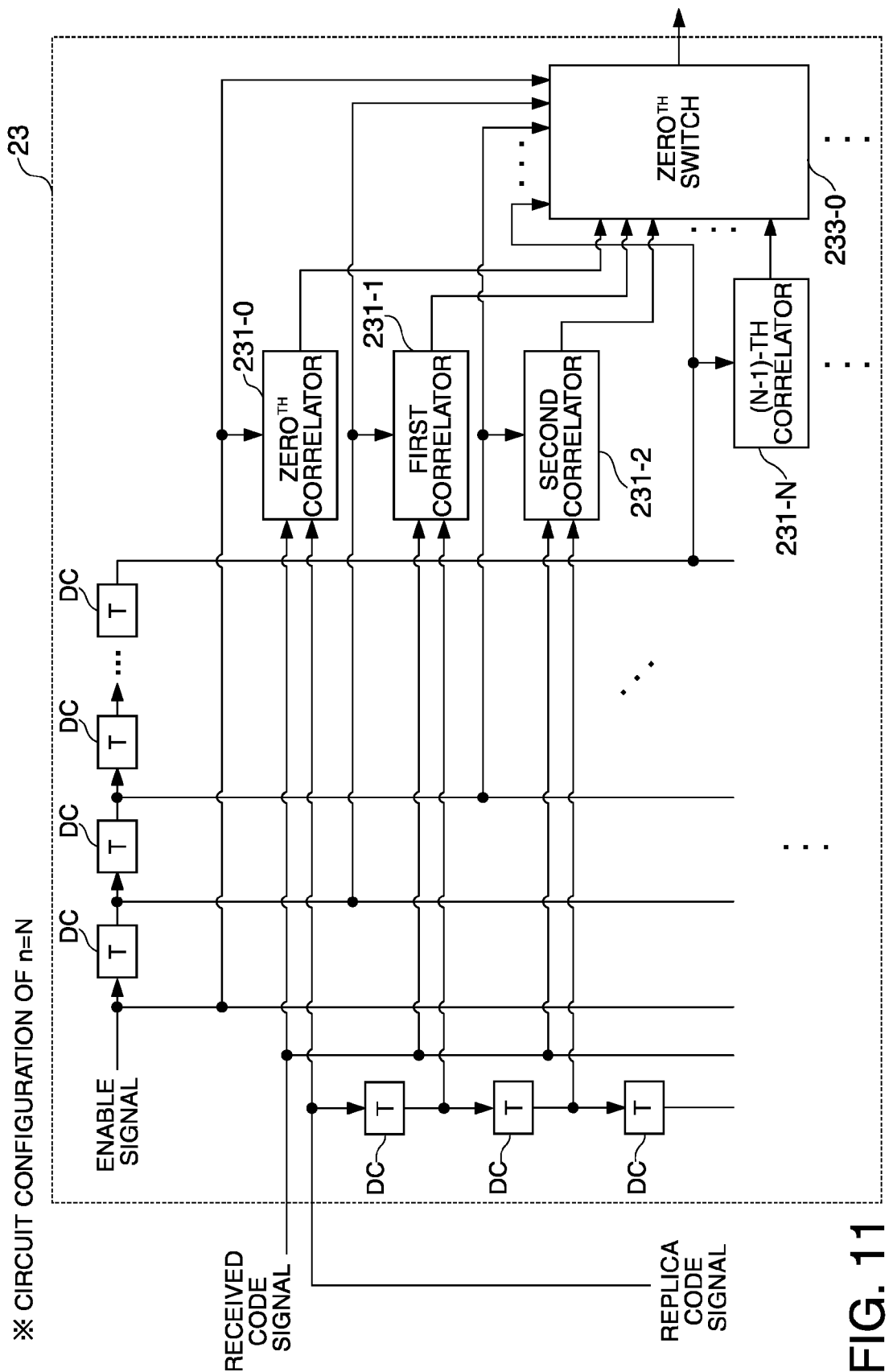
FIG. 11 is a diagram illustrating the circuit configuration of the correlation calculating circuit of the first type when n=N.

FIG. 11 is a diagram illustrating the circuit configuration of the correlation calculating circuit 23 when the correlation calculating circuit is generalized to sample the received code signal and perform the correlation calculating process at the 1/N-chip (n=N) intervals, where the zeroth correlation calculation set attracts the attention. The sampling interval of the received code signal is "T=1/N chip".

In the correlation calculating circuit 23 shown in FIG. 11, N successive correlators constitute a correlation calculation set. For example, N correlators of the zeroth correlator 231-0 to the (N−1)-th correlator 231-(N−1) constitute a zeroth correlation calculation set and the output signals of the correlators are output to the zeroth switch 233-0. Similarly, N correlators of the first correlator 231-1 to the N-th correlator 231-N constitute the first correlation calculation set and the output signals of the correlators are output to the first switch 233-1.

Plural stages of delay circuits DC are arranged so as to input the replica code signals delayed by "T=1/N chip" to the N correlators included in each correlation calculation set. That is, in the zeroth correlation calculation set, the replica code signal with a delay of "0" is input to the zeroth correlator 231-0, the replica code signal with a delay of "T" is input to the first correlator 231-1, the replica code signal with a delay of "2T" is input to the second correlator 231-2, and the replica code signal is input in this way.

Plural stages of delay circuits DC are formed to input the enable signals with a one-chip period delayed by "T=1/N chip" to the correlators of each correlation calculation set. That is, in the zeroth correlation calculation set, the first enable signal with a delay of "0" is input to the zeroth correlator 231-0, the second enable signal with a delay of "T=1/N chip" is input to the first correlator 231-1, the third enable signal with a delay of "2T=2/N chip" is input to the second correlator 231-2, and the enable signals are input in this way.

FIG. 12 is a graph obtained by diagrammatizing the correlation calculating times in the case of n=N. The viewpoint of the graph is the same as FIG. 10. Since n=N, N successive sampling times correspond to a one-chip period. N successive correlators constitute a correlation calculation set.

For example, paying attention to the zeroth correlation calculation set, the zeroth correlator 231-0 correlates "$r_i$" with "$d_1$" at the first sampling time, the first correlator 231-1 correlates "$r_1$" with "$d_2$" at the second sampling time, the second correlator 231-2 correlates "$r_i$" with "$d_3$" at the third sampling time, and the (N−1)-th correlator 231-(N−1) correlates "$r_1$" with "$d_N$" at the N-th sampling time.

Referring to the circuit block diagram shown in FIG. 4 again, the processor 25 is a controller comprehensively controlling the functional elements of the baseband processing circuit unit 20 and includes a processor such as a CPU. The processor 25 serves as a capturing unit capturing a GPS satellite signal using the correlation calculation result output from the correlation calculating circuit 23. The processor 25 includes a satellite signal capturing section 251 and a position calculating section 253 as principal functional elements.

The satellite signal capturing section 251 is a signal capturing section capturing a GPS satellite signal by detecting a peak over the correlation calculation result output from the correlation calculating circuit 23 and detecting the phase (code phase) of the received code signal.

More specifically, the satellite signal capturing section 251 calculates a correlation value on the basis of the synthesis signal of the correlation calculation results output from the switches 233 of the correlation calculating circuit 23. That is, the satellite signal capturing section sums the synthesis results of the channel outputs from the switches 233 (the zeroth switch 233-0, the first switch 233-1, the second switch 233-2, . . . ) to calculate the correlation value of each correlation calculation set. The satellite signal capturing section determines the peak of the correlation values by comparing the correlation values of the correlation calculation sets and specifies the phase (code phase) of the received code signal from the delay of the replica code signal corresponding to the correlation calculation set having the maximum correlation value.

The position calculating section 253 is a calculator calculating a known position calculating operation using the GPS satellite signal captured by the satellite signal capturing section 251 to calculate the position of the mobile phone 1 and outputs the calculated position to the host CPU 30.

The storage section 27 is formed of a memory device (memory) such as a ROM (Read Only Memory) or a flash ROM and a RAM (Random Access Memory) and stores a system program for the baseband processing circuit unit 20 and various programs and data for embodying various functions such as a satellite signal capturing function or a position calculating function. The storage section further includes a work area temporarily storing processing data and process results of various processes.

The storage section 27 stores a baseband processing program 271 to be read and executed as the baseband processing procedure (see FIG. 13) by the processor 25 as a program as shown in FIG. 4. The storage section stores satellite orbit data 272 and correlation calculation result data 273 as data.

The baseband processing procedure is a procedure of causing the processor 25 to perform a process of capturing a GPS satellite signal on the basis of the correlation calculation results of the correlation calculation sets output from the correlation calculating circuit 23 on the GPS satellites (hereinafter, referred to as "target satellites") to be captured and to perform a position calculating process using the captured GPS satellite signals to calculate the position of the mobile phone 1. The baseband processing procedure will be described in detail later with reference to a flow diagram.

The satellite orbit data 272 is data such as an almanac including rough satellite orbit information of all the GPS satellites or an ephemeris including detailed satellite orbit information of all the GPS satellites. The satellite orbit data 272 can be acquired by decoding the GPS satellite signals received from the GPS satellites and can also be acquired as assist data from a base station of the mobile phone 1 or an assist serve.

The correlation calculation result data 273 is data of the correlation calculation results of the correlation calculation sets output from the correlation calculating circuit 23 for every correlation calculation set.

Referring to the functional block diagram shown in FIG. 3 again, the host CPU 30 is a processor comprehensively controlling the units of the mobile phone 1 in accordance with various programs such as system programs stored in the storage unit 80. The host CPU 30 displays a map in which a current position is marked on the display unit 50 on the basis of the positional coordinate output from the baseband processing circuit unit 20 or uses the positional coordinate for various application processes.

The operation unit 40 is an input device including, for example, a touch panel or button switches, and outputs a signal of a pressed key or button to the host CPU 30. Various instructions such as a calling request, a mail transmitting and receiving request, and a position calculating request are input by the operation of the operation unit 40.

The display unit 50 is formed of an LCD (Liquid Crystal Display) or the like and is a display device displaying various pictures based on display signals input from the host CPU 30. A position display picture or time information is displayed on the display unit 50.

The mobile-phone antenna 60 is an antenna transmitting and receiving mobile-phone wireless signals to and from a wireless base station provided by a communication service provider of the mobile phone 1.

The mobile-phone wireless communication circuit unit 70 is a mobile-phone communication circuit unit including an RF conversion circuit, a baseband processing circuit, and the like, and embodies the calling or the transmission and reception of mails by modulating, demodulating, and the like of the mobile-phone wireless signal.

The storage unit 80 is a memory device storing a system program allowing the host CPU 30 to control the mobile phone 1 and various programs and data for processing various applications.

2-2. Flow of Processes

Figure 13:
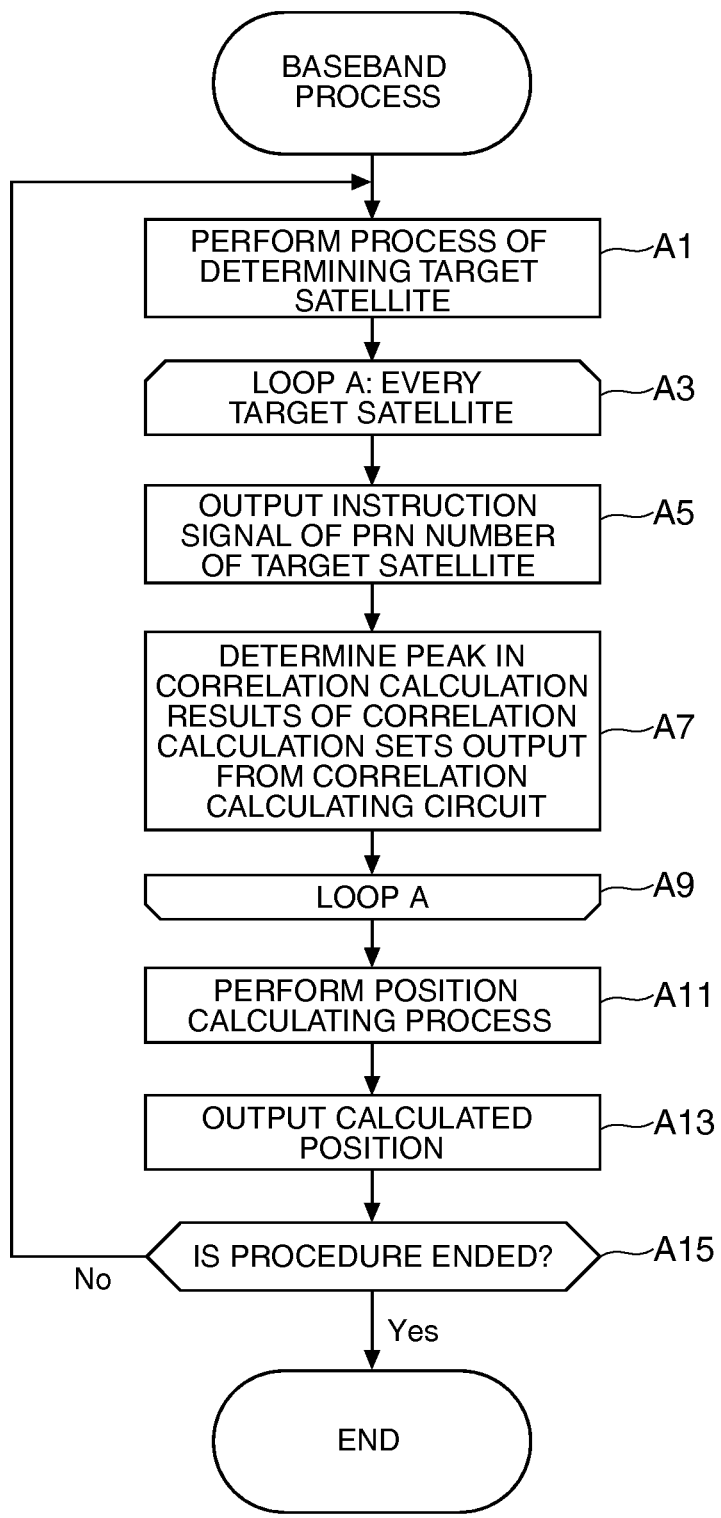
FIG. 13 is a flow diagram illustrating the flow of a baseband process.

FIG. 13 is a flow diagram illustrating the flow of a baseband processing procedure which is carried out by the baseband processing circuit unit 20 by causing the processor 25 to read the baseband processing program 271 stored in the storage section 27.

First, the satellite signal capturing section 251 performs a target satellite determining process (step A1). Specifically, the satellite signal capturing section determines as a target satellite a GPS satellite located on the roof of heaven at a given reference position at the current time counted by a timepiece (not shown) on the basis of the satellite orbit data 272 such as the almanac or the ephemeris stored in the storage section 27. The reference position can be set to a position acquired from an assist server by a so-called server assist, for example, when the position calculating process is first performed after the power source is turned on, and can be set to the newest calculated position when the position calculating process is second or subsequently performed.

Then, the satellite signal capturing section 251 performs the processes of loop A on the target satellites determined in step A1 (steps A3 to A9). In the processes of loop A, the satellite signal capturing section 251 outputs an instruction signal of the PRN numbers (satellite numbers) of the target satellites to the replica code signal generator 24 (step A5).

In step A5, the replica code signal obtained by replicating the CA code of the corresponding target satellite is generated by the replica code signal generator 24 and is output to the correlation calculating circuit 23. The correlation calculating process based on the above-mentioned principles is performed by the correlation calculating circuit 23 and the correlation calculation results of the correlation calculation sets are output to the processor 25.

The satellite signal capturing section 251 determines a peak over the correlation calculation results of the correlation calculation sets output from the correlation calculating circuit 23 (step A7). Then, the satellite signal capturing section performs the process on the next target satellite. When performing the processes of steps A5 and A7 on all the target satellites, the satellite signal capturing section 251 ends the processes of loop A (step A9).

Thereafter, the position calculating section 253 performs the position calculating process using the GPS satellite signals captured for the target satellites (step A11). The position calculating process can be embodied by performing a known convergence operation, for example, using a least square method or a Kalman filter on the basis of the pseudo distances between the mobile phone 1 and the target satellites.

The pseudo distances can be calculated as follows. That is, the integral part of the pseudo distance is calculated using the satellite position of the captured satellite acquired from the satellite orbit data 272 and the newest calculated position of the mobile phone 1. Then, the fractional part of the pseudo distance is calculated using the phase (code phase) of the replica code signal corresponding to the peak of the correlation calculation results detected in step A7. The integral part and the fractional part calculated in this way are summed to calculate the pseudo distance.

Subsequently, the position calculating section 253 outputs the calculated position (positional coordinate) to the host CPU 30 (step A13). Then, the processor 25 determines whether the flow of processes is ended (step A15), performs the process of step A1 when it is determined that the flow of processes is not ended (NO in step A15), and ends the baseband processing procedure when it is determined that the flow of processes is ended (YES in step A15).

2-3. Operational Advantages

In the baseband processing circuit unit 20, the received signal is demodulated by multiplying the received signal as the reception result of the GPS satellite signal by the carrier removing signal generated from the carrier removing signal generator 22 by the use of the multiplication section 21. The demodulated received code signal is sampled at the $1/n$-chip intervals (where n is an integer equal to or greater than 2) in the chip period of the CA code by the correlation calculating circuit 23. The replica code signal generated by the replica code signal generator 24 is sampled at the one-chip intervals which is the chip period of the CA code.

That is, the values of the received code signal at the first to n-th arrival times which are obtained by varying the arrival time of the chip period of the CA code by $1/n$ chip are obtained. The replica code signal with the chip period is obtained. The values of the received code signal at the first to n-th arrival times and the values of the replica code signal with the chip period are subjected to the correlation calculation process by the correlators 231 and the correlation calculation results are synthesized by the switches 233, whereby the correlation calculation results at the 1/n-chip intervals are obtained.

As a result, it is possible to greatly reduce the calculation amount, compared with the case where the received code signal and the replica code signal are sampled at the 1/n-chip intervals and the correlation calculating process is performed on the whole phase in a round-robin manner. In the method according to this embodiment, it is not necessary to sample the replica code signal at the 1/n-chip intervals, unlike the related art. That is, since the sampling interval of the replica code signal can be elongated, the sampling of a signal is completed at a lower frequency. Accordingly, it is possible to reduce the calculation amount and also to reduce the power consumption involved in the sampling.

By detecting the code phase of the received code signal using the correlation calculation results calculated by the correlation calculating circuit 23, it may be possible to accurately and satisfactorily capture a GPS satellite signal.

Second Embodiment

A second embodiment of the invention is an embodiment of a correlation calculating circuit having a processing type of cumulatively storing the multiplication results of the sampled values in the correlators and extracting the values at a predetermined time to perform the correlation calculating process, unlike the correlation calculating circuit of the first type described in the first embodiment. In this specification, this processing type is referred to as a "second type".

Figure 14:
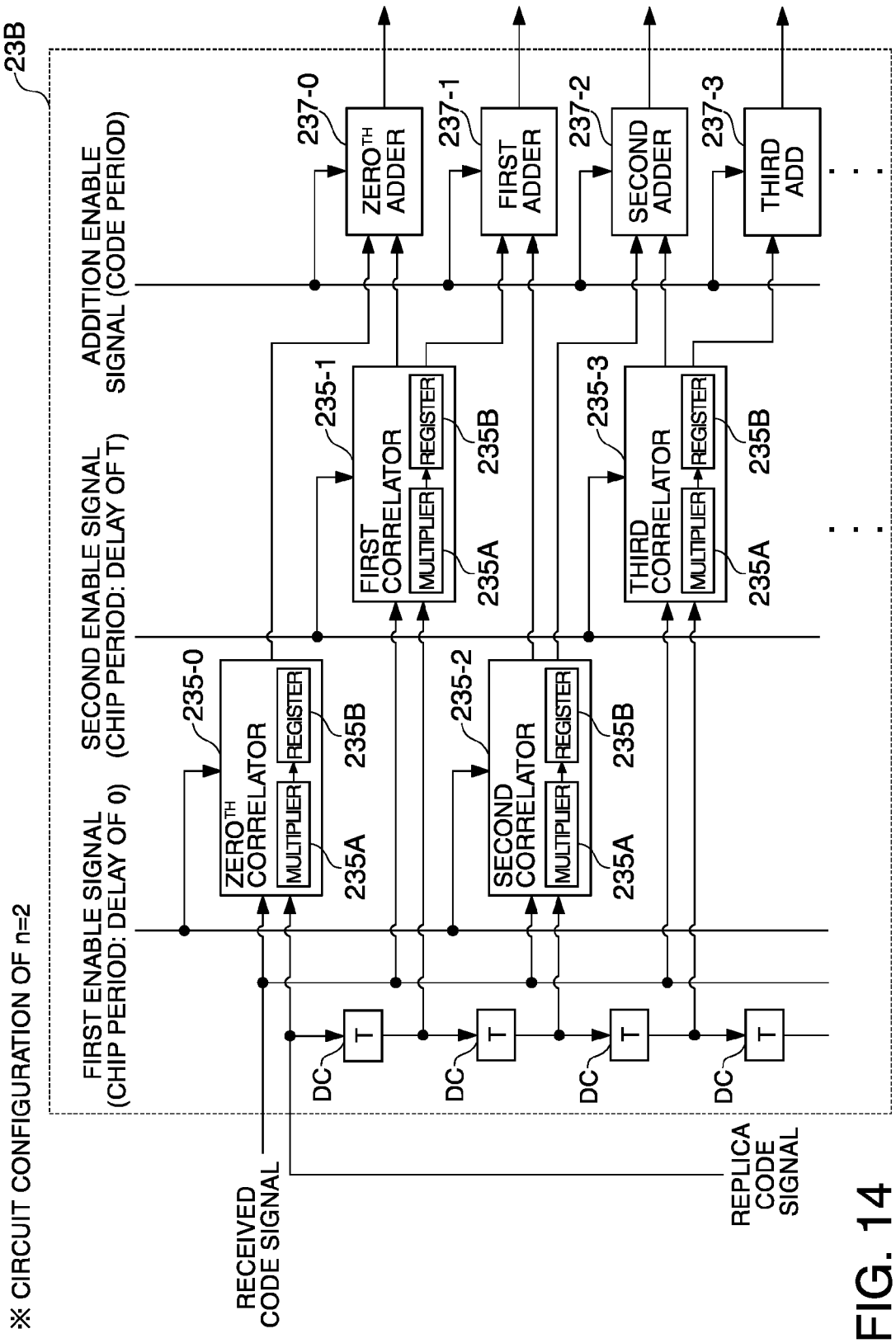
FIG. 14 is a diagram illustrating the circuit configuration of a correlation calculating circuit of a second type when n=2.
Figure 15:
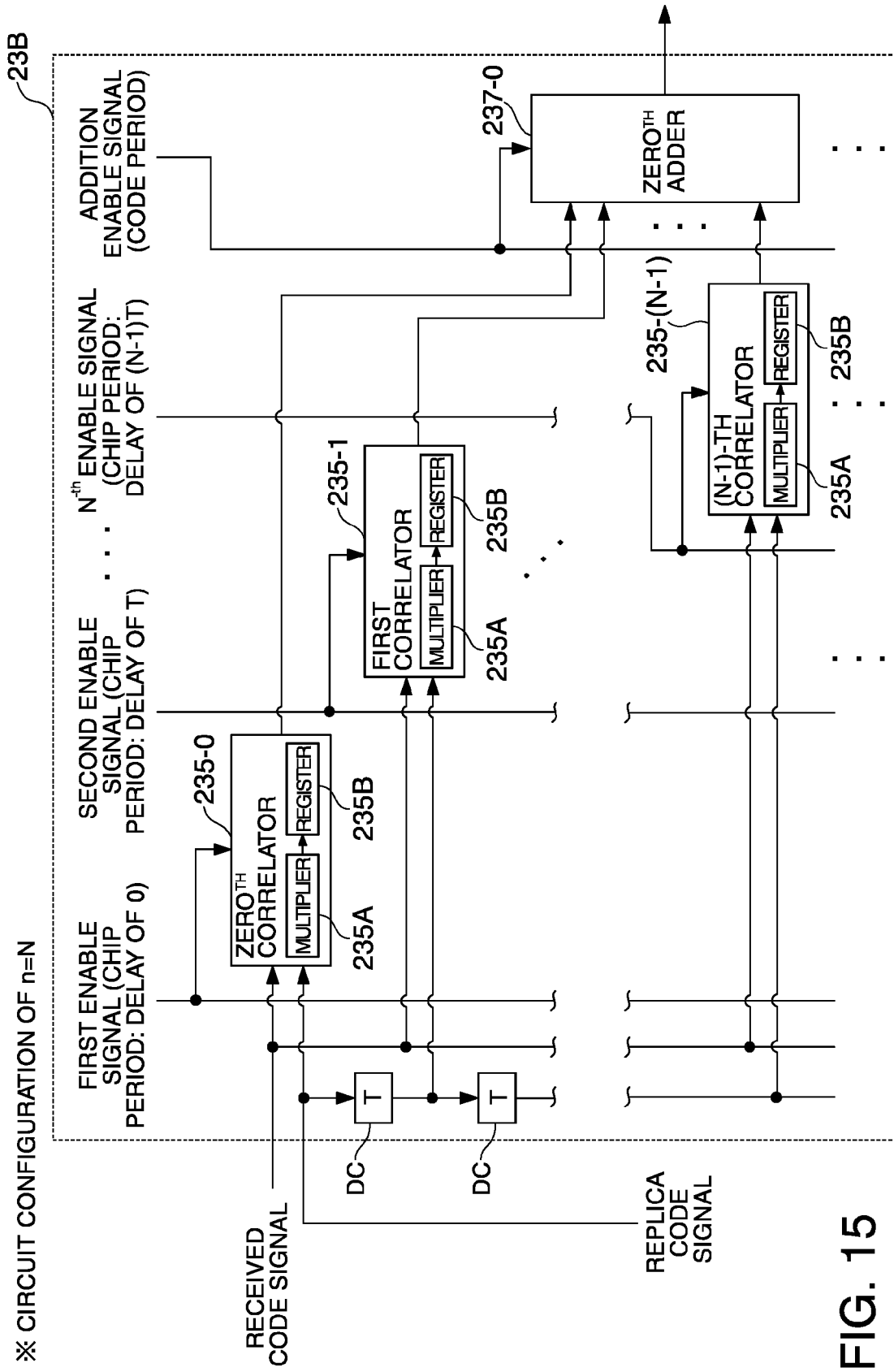
FIG. 15 is a diagram illustrating the circuit configuration of the correlation calculating circuit of the second type when n=N.

FIGS. 14 and 15 are block diagrams illustrating the circuit configuration of the second type of correlation calculating circuit. FIG. 14 shows an example of the circuit configuration of the correlation calculating circuit 23B when n=2, and FIG. 15 shows an example of the circuit configuration of the correlation calculating circuit 23B when n=N.

When n=2, the correlation calculating circuit 23B shown in FIG. 14 includes plural correlators 235 (a zeroth correlator 235-0, a first correlator 235-1, a second correlator 235-2, a third correlator 235-3, . . . ) as a correlation calculating section and plural adders 237 (a zeroth adder 237-0, a first adder 237-1, a second adder 237-2, a third adder 237-3, . . . ) as a synthesis section.

Each correlator 235 includes a multiplier 235A and a register 235B. The multiplier 235A samples and multiplies the received code signal and the replica code signal in accordance with an enable signal. The register 235B is a memory circuit cumulatively storing the multiplication result of the multiplier 235A. Specifically, the multiplication result of the multiplier 235A at each multiplication time is cumulatively added by the register 235B.

The first enable signal with a chip period (=one-chip interval) is input to the even-degree correlators 235-2$m$. Similarly, the second enable signal with a chip period (=one-chip interval) is input to the odd-degree correlators 235-($2m$+1). Here, the second enable signal is delayed by "T=½ chip" from the first enable signal.

In the even-degree correlators 235-$2m$, the sampling and the multiplication are performed at the chip periods in accordance with the first enable signal and the multiplication result is cumulatively stored in the register 235B. In the odd-degree correlators 235-($2m$+1), the sampling and the multiplication are performed at the chip periods in accordance with the second enable signal and the multiplication result is cumulatively stored in the register 235B. The first enable signal and the second enable signal temporally depart from each other by ½ chip. Accordingly, the values of the received code signal at the first and second arrival times which are obtained by varying the arrival time of the chip period by ½ chip are correlated with the sampled values of the replica code signal at the chip period by the set of two adjacent correlators 235 (correlation calculation set).

An addition enable signal with the code period (=1023-chip interval) is input to the adders 237. The adders 237 extract the correlation calculation results of the adjacent correlators 235 at the time of the code period in accordance with the addition enable signal. That is, the adders read the added value of the multiplication results of 1023 chips stored in the registers 235B of the correlators 235. Then, the adders add the added values extracted from two adjacent correlators 235 and output the resultant values as the correlation calculation results at the ½-chip intervals to the processor 25.

The behavior of the correlation calculating circuit 23B when n=N is the same. That is, in the correlation calculating circuit 23B shown in FIG. 15, N successive correlators 235 constitute a correlation calculation set. Specifically, N correlators 235 of the zeroth correlator 235-0 to the (N−1)-th correlator 235-(N−1) constitute the zeroth correlation calculation set. The correlation calculation results cumulatively stored in the registers 235B of the correlators 235 are output to the zeroth adder 237-0. Similarly, N correlators 235 of the first correlator 235-1 to the N-th correlator 235-N constitute the first correlation calculation set and the correlation calculation results cumulatively stored in the registers 235B of the correlators 235 are output to the first adder 237-1.

The first enable signal to the N-th enable signal with the chip period which are temporally delayed by "T=1/N chip" are input to the N correlators 235 of each correlation calculation set. The addition enable signal with the code period is input to the adders 237. Accordingly, the N correlators 235 of each correlation calculation set correlate the received code signal and the replica code signal at the times varying by 1/N chip. The adders 237 read the added values of the multiplication results of 1023 chips stored in the registers 235B of the correlators 235, add the added values, and output the resultant value as the correlation calculation result at the 1/N-chip interval to the processor 25.

3. Modifications 3-1. Electronic Apparatuses

In the above-described embodiments, the invention has been applied to a mobile phone which is a type of electronic apparatus, but the electronic apparatus to which the invention is able to be applied is not limited thereto. For example, the invention may be similarly applied to other electronic apparatuses such as a car navigation apparatus, a mobile navigation apparatus, a personal computer, a personal digital assistant (PDA), and a wrist watch.

3-2. Position Calculating System

In the above-described embodiments, the GPS has been exemplified as the position calculating system, but a position calculating system using other satellite positioning systems such as WAAS (Wide Area Augmentation System), QZSS (Quasi Zenith Satellite System), GLONASS (Global Navigation Satellite System), and GALILEO may be employed.

3-3. Correlation Calculation

In the above-described embodiments, it has been described that the correlation of the replica code signal with the received code signal is carried out in a hardware manner by the correlation calculating circuit, but the processor 25 may carry out the correlation calculation in a software manner by the use of a digital signal process.

In this case, data of the sampled values of the received code signal and data of the sampled values of the replica code signal are cumulatively stored in the storage section 27. Then, the correlation calculating process of the replica code signal with the received code signal can be performed in a software manner using the correlation calculating method described in the "Principle" on the basis of the data of the sampled values cumulatively stored in advance.

3-4. Correlation Calculating Circuit

In the "Principle", it has been described that the same result is obtained by correlating any one time-series data of the time-series data of the odd-degree sampled values of the replica code signal and the time-series data of the even-order sampled values thereof with the time-series data of the sampled values of the received code signal. Accordingly, the correlation calculating circuit unit 23 according to the abovementioned embodiments may be modified as described below.

For example, in the circuit configuration of the correlation calculating circuit unit 23 shown in FIG. 5 when "n=2", a delay circuit DC that delays the replica code signal by "T=½ chip" may be disposed in the front stage of a branch point from which the replica code signal is branched to the zeroth correlator 231-0 and the first delay circuit DC. In this case, the replica code signal with a delay of "T" is input to the zeroth correlator 231-0, the replica code signal with a delay of "2T" is input to the first correlator 231-1, the replica code signal with a delay of "3T" is input to the second correlator 231-2, and the replica code signal with a delay of "(m+1)T" is input to the m-th correlator 231-$m$. This corresponds to the correlation calculation using the combination of multiplication terms shown in FIG. 1C, and the correlation calculating circuit unit 23 works in accordance with the timing diagram shown in FIG. 7.

What is claimed is:

1. A calculating method comprising:
    sampling, by a calculation circuit, a code signal at ½ chip interval to obtain sampling values;
    extracting, by the calculation circuit, first sampling code and second sampling code from at least a part of the sampling values, the first sampling code including odd-degree sampling values and the second sampling code including even-degree sampling values;
    correlating, by the calculation circuit, the first sampling code and a replica code to obtain first correlation result;
    correlating, by the calculation circuit, the second sampling code and the replica code to obtain second correlation result;
    synthesizing, by the calculation circuit, the first correlation result and the second correlation result to obtain first synthesis result at ½ chip interval; and
    reusing, by the calculation circuit, the first correlation result or the second correlation result to obtain second synthesis result at ½ chip interval.

2. The method according to claim 1, further comprising:
    correlating relatively shifted first sampling code and the replica code by 1 chip to obtain third correlation result, wherein
    the reusing the first correlation result or the second correlation result includes:
        synthesizing the second correlation result and the third correlation result to obtain the second synthesis result at ½ chip interval.

3. The method according to claim 1, further comprising:
    correlating relatively shifted second sampling code and the replica code by 1 chip to obtain third correlation result, wherein
    the reusing the first correlation result or the second correlation result includes:
        synthesizing the first correlation result and the third correlation result to obtain the second synthesis result at ½ chip interval.

4. The method according to claim 1, further comprising:
    correlating the first sampling code and a shifted replica code to obtain third correlation result, the shifted replica code being obtained by shifting the replica code by 1 chip, wherein
    the reusing the first correlation result or the second correlation result includes:
        synthesizing the second correlation result and the third correlation result to obtain the second synthesis result at ½ chip interval.

5. The method according to claim 1, further comprising:
    correlating a shifted first sampling code and the replica code to obtain third correlation result, the shifted first sampling code being obtained by shifting the first sampling code by 1 chip, wherein
    the reusing the first correlation result or the second correlation result includes:
        synthesizing the second correlation result and the third correlation result to obtain the second synthesis result at ½ chip interval.

6. The method according to claim 1, further comprising:
    receiving a positioning satellite signal; and
    demodulating the positioning satellite signal to obtain the code signal.

7. The method according to claim 6, wherein
    the positioning satellite signal is transmitted from a positioning satellite of at least one of Global Positioning System (GPS), Wide Area Augmentation System (WAAS), Quasi Zenith Satellite System (QZSS), GLObal NAvigation Satellite System (GLONASS), or GALILEO.

8. The method according to claim 1, further comprising:
    sampling a replica code signal at 1 chip interval to obtain the replica code.

9. A signal capturing method, comprising:
    performing the calculating method according to claim 6; and
    capturing the positioning satellite signal using the first synthesis result and the second synthesis result.

10. A calculating device, comprising:
    a sampler that samples a code signal at ½ chip interval to obtain sampling values;
    an extractor that extracts first sampling code and second sampling code from at least a part of the sampling values, the first sampling code including odd-degree sampling values and the second sampling code including even-degree sampling values;
    a correlator that correlates the first sampling code and a replica code to obtain first correlation result, and that correlates the second sampling code and the replica code to obtain second correlation result; and
    a synthesizer that synthesizes the first correlation result and the second correlation result to obtain first synthesis result at ½ chip interval, and that reuses the first correlation result or the second correlation result to obtain second synthesis result at ½ chip interval.

11. The calculating circuit according to claim 10, wherein
the correlator correlates relatively shifted first sampling code and the replica code by 1 chip to obtain third correlation result; and
the synthesizer synthesizes the second correlation result and the third correlation result to obtain the second synthesis result at ½ chip interval.

12. The calculating circuit according to claim 10, further comprising:
a delay circuit that inputs a delayed replica code by 1 chip to the correlator, wherein
the correlator correlates the first sampling code and the delayed replica code to obtain third correlation result; and
the synthesizer synthesizes the second correlation result and the third correlation result to obtain the second synthesis result at ½ chip interval.

13. The calculating circuit according to claim 10, further comprising:
a memory that stores at least one of the first correlation result and the second correlation result, wherein
the synthesizer uses the at least one of the first correlation result or the second correlation result stored in the memory.

14. A receiver, comprising:
an RF receiver that receives a positioning satellite signal;
a demodulator that demodulates the positioning satellite signal to obtain the code signal; and
the calculating device according to claim 10.

15. An electronic apparatus, comprising:
the calculating device according to claim 10.

16. The electronic apparatus according to claim 15, wherein
the electronic apparatus is any one of a mobile phone, a car navigation apparatus, a mobile navigation apparatus, a personal computer, a personal digital assistant, and a wrist watch.

17. A calculating method comprising:
sampling, by a calculation circuit, a code signal at 1/n chip interval to obtain sampling values;
extracting, by the calculation circuit, n number of sets of sampling values from the sampling values, $x^{th}$ set of the n number of sets of the sampling values including $k^{th}$ sampling values, k satisfying k mod (n)=x or zero, where "k mod (n)" means the residue modulo n, x being an integer from 1 to n, n being an integer equal to or greater than 2, k being integers from 1 to n*L, and L being code length of the code signal;
obtaining, by the calculation circuit, n number of correlation results, each of the correlation results corresponding to one of 1st to nth set of sampling values, and the correlation result for the $x^{th}$ set of sampling values being obtained by correlating the $x^{th}$ set of sampling values with a replica code;
synthesizing, by the calculation circuit, the 1st to nth correlation results to obtain first synthesis result at 1/n chip interval;
obtaining, by the calculation circuit, $(n+1)^{th}$ correlation result by correlating a relatively shifted $1^{st}$ set of sampling values and the replica code by 1 chip; and
synthesizing, by the calculation circuit, the $2^{nd}$ to $(n+1)^{th}$ correlation results to obtain a second synthesis result at 1/n chip interval.

18. The method according to claim 17, wherein
the obtaining $(n+1)^{th}$ correlation result includes:
correlating a shifted 1st set of sampling values and the replica code, the shifted 1st set of sampling values being obtained by shifting the 1st set of sampling values by 1 chip.

19. The method according to claim 17, wherein
the obtaining $(n+1)^{th}$ correlation result includes:
correlating the 1st set of sampling values and a shifted replica code, the shifted replica code being obtained by shifting the replica code by 1 chip.

20. A signal capturing method, comprising:
receiving a positioning satellite signal;
demodulating the positioning satellite signal to obtain the code signal;
performing the calculating method according to claim 17; and
capturing the positioning satellite signal using the first synthesis result and the second synthesis result.

* * * * *